United States Patent
Byers et al.

(10) Patent No.: US 11,044,162 B2
(45) Date of Patent: Jun. 22, 2021

(54) ORCHESTRATION OF CLOUD AND FOG INTERACTIONS

(71) Applicant: Cisco Technology, Inc., San Jose, CA (US)

(72) Inventors: Charles Calvin Byers, Wheaton, FL (US); Gonzalo Salgueiro, San Jose, CA (US); Joseph Michael Clarke, Raleigh, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 388 days.

(21) Appl. No.: 15/371,038

(22) Filed: Dec. 6, 2016

(65) Prior Publication Data

US 2018/0159745 A1    Jun. 7, 2018

(51) Int. Cl.
| | |
|---|---|
| *H04L 12/24* | (2006.01) |
| *H04L 12/26* | (2006.01) |
| *G06F 9/455* | (2018.01) |
| *H04L 29/08* | (2006.01) |

(52) U.S. Cl.
CPC .............. *H04L 41/12* (2013.01); *G06F 9/455* (2013.01); *H04L 41/0893* (2013.01); *H04L 41/0896* (2013.01); *H04L 43/08* (2013.01); *H04L 41/5096* (2013.01); *H04L 67/34* (2013.01)

(58) Field of Classification Search
CPC ................................... H04L 67/12; G06F 8/70
See application file for complete search history.

(56) References Cited

U.S. PATENT DOCUMENTS

| | | | |
|---|---|---|---|
| 5,812,773 | A | 9/1998 | Norin |
| 5,889,896 | A | 3/1999 | Meshinsky et al. |
| 6,108,782 | A | 8/2000 | Fletcher et al. |
| 6,178,453 | B1 | 1/2001 | Mattaway et al. |

(Continued)

FOREIGN PATENT DOCUMENTS

| | | |
|---|---|---|
| CN | 101719930 | 6/2010 |
| CN | 101394360 | 7/2011 |

(Continued)

OTHER PUBLICATIONS

Dastjeredi et al. "Internet of Things, Principles and Paradigms", Chapter 4, "Fog Computing: Principles, Architectures, and Applications", Jun. 17, 2016 (Year: 2016).*

(Continued)

*Primary Examiner* — Tonia L Dollinger
*Assistant Examiner* — Ishrat Rashid
(74) *Attorney, Agent, or Firm* — Polsinelli PC

(57) ABSTRACT

Systems, methods, and computer-readable media for orchestrating cloud to fog interactions. In some examples, a method can involve partitioning an application into software containers, each of the software containers being configured to host a respective component of the application. The method can further involve identifying nodes on respective hierarchical layers of a hierarchical cloud-fog architecture for hosting the software containers on the respective hierarchical layers of the cloud-fog architecture. The hierarchical cloud-fog architecture can include one or more cloud layers and one or more fog layers. The method can also involve deploying the software containers at the nodes on the respective hierarchical layers of the cloud-fog architecture.

20 Claims, 9 Drawing Sheets

(56) References Cited

U.S. PATENT DOCUMENTS

| | | |
|---|---|---|
| 6,298,153 B1 | 10/2001 | Oishi |
| 6,343,290 B1 | 1/2002 | Cossins et al. |
| 6,643,260 B1 | 11/2003 | Kloth et al. |
| 6,683,873 B1 | 1/2004 | Kwok et al. |
| 6,721,804 B1 | 4/2004 | Rubin et al. |
| 6,733,449 B1 | 5/2004 | Krishnamurthy et al. |
| 6,735,631 B1 | 5/2004 | Oehrke et al. |
| 6,885,670 B1 | 4/2005 | Regula |
| 6,996,615 B1 | 2/2006 | McGuire |
| 7,054,930 B1 | 5/2006 | Cheriton |
| 7,058,706 B1 | 6/2006 | Lyer et al. |
| 7,062,571 B1 | 6/2006 | Dale et al. |
| 7,076,397 B2 | 7/2006 | Ding et al. |
| 7,111,177 B1 | 9/2006 | Chauvel et al. |
| 7,212,490 B1 | 5/2007 | Kao et al. |
| 7,277,948 B2 | 10/2007 | Igarashi et al. |
| 7,313,667 B1 | 12/2007 | Pullela et al. |
| 7,379,846 B1 | 5/2008 | Williams et al. |
| 7,480,672 B2 | 1/2009 | Hahn et al. |
| 7,496,043 B1 | 2/2009 | Leong et al. |
| 7,536,476 B1 | 5/2009 | Alleyne |
| 7,567,504 B2 | 7/2009 | Darling et al. |
| 7,606,147 B2 | 10/2009 | Luft et al. |
| 7,647,594 B2 | 1/2010 | Togawa |
| 7,684,322 B2 | 3/2010 | Sand et al. |
| 7,773,510 B2 | 8/2010 | Back et al. |
| 7,808,897 B1 | 10/2010 | Mehta et al. |
| 7,881,957 B1 | 2/2011 | Cohen et al. |
| 7,917,647 B2 | 3/2011 | Cooper et al. |
| 8,010,598 B2 | 8/2011 | Tanimoto |
| 8,028,071 B1 | 9/2011 | Mahalingam et al. |
| 8,041,714 B2 | 10/2011 | Aymeloglu et al. |
| 8,121,117 B1 | 2/2012 | Amdahl et al. |
| 8,171,415 B2 | 5/2012 | Appleyard et al. |
| 8,234,377 B2 | 7/2012 | Cohn |
| 8,244,559 B2 | 8/2012 | Horvitz et al. |
| 8,250,215 B2 | 8/2012 | Stienhans et al. |
| 8,280,880 B1 | 10/2012 | Aymeloglu et al. |
| 8,284,664 B1 | 10/2012 | Aybay et al. |
| 8,284,776 B2 | 10/2012 | Petersen |
| 8,301,746 B2 | 10/2012 | Head et al. |
| 8,345,692 B2 | 1/2013 | Smith |
| 8,406,141 B1 | 3/2013 | Couturier et al. |
| 8,407,413 B1 | 3/2013 | Yucel et al. |
| 8,448,171 B2 | 5/2013 | Donnellan et al. |
| 8,477,610 B2 | 7/2013 | Zuo et al. |
| 8,495,252 B2 | 7/2013 | Lais et al. |
| 8,495,356 B2 | 7/2013 | Ashok et al. |
| 8,510,469 B2 | 8/2013 | Portolani |
| 8,514,868 B2 | 8/2013 | Hill |
| 8,532,108 B2 | 9/2013 | Li et al. |
| 8,533,687 B1 | 9/2013 | Greifeneder et al. |
| 8,547,974 B1 | 10/2013 | Guruswamy et al. |
| 8,560,639 B2 | 10/2013 | Murphy et al. |
| 8,560,663 B2 | 10/2013 | Baucke et al. |
| 8,589,543 B2 | 11/2013 | Dutta et al. |
| 8,590,050 B2 | 11/2013 | Nagpal et al. |
| 8,611,356 B2 | 12/2013 | Yu et al. |
| 8,612,625 B2 | 12/2013 | Andries et al. |
| 8,630,291 B2 | 1/2014 | Shaffer et al. |
| 8,639,787 B2 | 1/2014 | Lagergren et al. |
| 8,656,024 B2 | 2/2014 | Krishnan et al. |
| 8,660,129 B1 | 2/2014 | Brendel et al. |
| 8,719,804 B2 | 5/2014 | Jain |
| 8,775,576 B2 | 7/2014 | Hebert et al. |
| 8,797,867 B1 | 8/2014 | Chen et al. |
| 8,805,951 B1 | 8/2014 | Faibish et al. |
| 8,850,182 B1 | 9/2014 | Fritz et al. |
| 8,856,339 B2 | 10/2014 | Mestery et al. |
| 8,909,780 B1 | 12/2014 | Dickinson et al. |
| 8,909,928 B2 | 12/2014 | Ahmad et al. |
| 8,918,510 B2 | 12/2014 | Gmach et al. |
| 8,924,720 B2 | 12/2014 | Raghuram et al. |
| 8,930,747 B2 | 1/2015 | Levijarvi et al. |
| 8,938,775 B1 | 1/2015 | Roth et al. |
| 8,959,526 B2 | 2/2015 | Kansal et al. |
| 8,977,754 B2 | 3/2015 | Curry, Jr. et al. |
| 9,009,697 B2 | 4/2015 | Breiter et al. |
| 9,015,324 B2 | 4/2015 | Jackson |
| 9,043,439 B2 | 5/2015 | Bicket et al. |
| 9,049,115 B2 | 6/2015 | Rajendran et al. |
| 9,063,789 B2 | 6/2015 | Beaty et al. |
| 9,065,727 B1 | 6/2015 | Liu et al. |
| 9,075,649 B1 | 7/2015 | Bushman et al. |
| 9,104,334 B2 | 8/2015 | Madhusudana et al. |
| 9,164,795 B1 | 10/2015 | Vincent |
| 9,167,050 B2 | 10/2015 | Durazzo et al. |
| 9,201,701 B2 | 12/2015 | Boldyrev et al. |
| 9,201,704 B2 | 12/2015 | Chang et al. |
| 9,203,784 B2 | 12/2015 | Chang et al. |
| 9,223,634 B2 | 12/2015 | Chang et al. |
| 9,244,776 B2 | 1/2016 | Koza et al. |
| 9,251,114 B1 | 2/2016 | Ancin et al. |
| 9,264,478 B2 | 2/2016 | Hon et al. |
| 9,313,048 B2 | 4/2016 | Chang et al. |
| 9,361,192 B2 | 6/2016 | Smith et al. |
| 9,380,075 B2 | 6/2016 | He et al. |
| 9,432,294 B1 | 8/2016 | Sharma et al. |
| 9,444,744 B1 | 9/2016 | Sharma et al. |
| 9,473,365 B2 | 10/2016 | Melander et al. |
| 9,503,530 B1 | 11/2016 | Niedzielski |
| 9,558,078 B2 | 1/2017 | Farlee et al. |
| 9,613,078 B2 | 4/2017 | Vermeulen et al. |
| 9,628,471 B1 | 4/2017 | Sundaram et al. |
| 9,632,858 B2 | 4/2017 | Sasturkar et al. |
| 9,658,876 B2 | 5/2017 | Chang et al. |
| 9,692,802 B2 | 6/2017 | Bicket et al. |
| 9,727,359 B2 | 8/2017 | Tsirkin |
| 9,736,063 B2 | 8/2017 | Wan et al. |
| 9,755,858 B2 | 9/2017 | Bagepalli et al. |
| 9,792,245 B2 | 10/2017 | Raghavan et al. |
| 9,804,988 B1 | 10/2017 | Ayoub et al. |
| 9,954,783 B1 | 4/2018 | Thirumurthi et al. |
| 2002/0004900 A1 | 1/2002 | Patel |
| 2002/0073337 A1 | 6/2002 | Ioele et al. |
| 2002/0143928 A1 | 10/2002 | Maltz et al. |
| 2002/0166117 A1 | 11/2002 | Abrams et al. |
| 2002/0174216 A1 | 11/2002 | Shorey et al. |
| 2003/0018591 A1 | 1/2003 | Komisky |
| 2003/0056001 A1 | 3/2003 | Mate et al. |
| 2003/0228585 A1 | 12/2003 | Inoko et al. |
| 2004/0004941 A1 | 1/2004 | Malan et al. |
| 2004/0095237 A1 | 5/2004 | Chen et al. |
| 2004/0131059 A1 | 7/2004 | Ayyakad et al. |
| 2004/0264481 A1 | 12/2004 | Darling et al. |
| 2005/0060418 A1 | 3/2005 | Sorokopud |
| 2005/0125424 A1 | 6/2005 | Herriott et al. |
| 2006/0059558 A1 | 3/2006 | Selep et al. |
| 2006/0104286 A1 | 5/2006 | Cheriton |
| 2006/0120575 A1 | 6/2006 | Ahn et al. |
| 2006/0126665 A1 | 6/2006 | Ward et al. |
| 2006/0146825 A1 | 7/2006 | Hofstaedter et al. |
| 2006/0155875 A1 | 7/2006 | Cheriton |
| 2006/0168338 A1 | 7/2006 | Bruegl et al. |
| 2006/0294207 A1 | 12/2006 | Barsness et al. |
| 2007/0011330 A1 | 1/2007 | Dinker et al. |
| 2007/0174663 A1 | 7/2007 | Crawford et al. |
| 2007/0223487 A1 | 9/2007 | Kajekar et al. |
| 2007/0242830 A1 | 10/2007 | Conrado et al. |
| 2008/0005293 A1 | 1/2008 | Bhargava et al. |
| 2008/0084880 A1 | 4/2008 | Dharwadkar |
| 2008/0165778 A1 | 7/2008 | Ertemalp |
| 2008/0198752 A1 | 8/2008 | Fan et al. |
| 2008/0201711 A1 | 8/2008 | Amir Husain |
| 2008/0235755 A1 | 9/2008 | Blaisdell et al. |
| 2009/0006527 A1 | 1/2009 | Gingell, Jr. et al. |
| 2009/0010277 A1 | 1/2009 | Halbraich et al. |
| 2009/0019367 A1 | 1/2009 | Cavagnari et al. |
| 2009/0031312 A1 | 1/2009 | Mausolf et al. |
| 2009/0083183 A1 | 3/2009 | Rao et al. |
| 2009/0138763 A1 | 5/2009 | Arnold |
| 2009/0177775 A1 | 7/2009 | Radia et al. |
| 2009/0178058 A1 | 7/2009 | Stillwell, III et al. |
| 2009/0182874 A1 | 7/2009 | Morford et al. |

(56) References Cited

U.S. PATENT DOCUMENTS

| | | |
|---|---|---|
| 2009/0265468 A1 | 10/2009 | Annambhotla et al. |
| 2009/0265753 A1 | 10/2009 | Anderson et al. |
| 2009/0293056 A1 | 11/2009 | Ferris |
| 2009/0300608 A1 | 12/2009 | Ferris et al. |
| 2009/0313562 A1 | 12/2009 | Appleyard et al. |
| 2009/0323706 A1 | 12/2009 | Germain et al. |
| 2009/0328031 A1 | 12/2009 | Pouyadou et al. |
| 2010/0042720 A1 | 2/2010 | Stienhans et al. |
| 2010/0061250 A1 | 3/2010 | Nugent |
| 2010/0115341 A1 | 5/2010 | Baker et al. |
| 2010/0131765 A1 | 5/2010 | Bromley et al. |
| 2010/0191783 A1 | 7/2010 | Mason et al. |
| 2010/0192157 A1 | 7/2010 | Jackson et al. |
| 2010/0205601 A1 | 8/2010 | Abbas et al. |
| 2010/0211782 A1 | 8/2010 | Auradkar et al. |
| 2010/0217886 A1 | 8/2010 | Seren et al. |
| 2010/0293270 A1 | 11/2010 | Augenstein et al. |
| 2010/0318609 A1 | 12/2010 | Lahiri et al. |
| 2010/0325199 A1 | 12/2010 | Park et al. |
| 2010/0325257 A1 | 12/2010 | Goel et al. |
| 2010/0325441 A1 | 12/2010 | Laurie et al. |
| 2010/0333116 A1 | 12/2010 | Prahlad et al. |
| 2011/0016214 A1 | 1/2011 | Jackson |
| 2011/0035754 A1 | 2/2011 | Srinivasan |
| 2011/0055396 A1 | 3/2011 | Dehaan |
| 2011/0055398 A1 | 3/2011 | Dehaan et al. |
| 2011/0055470 A1 | 3/2011 | Portolani |
| 2011/0072489 A1 | 3/2011 | Parann-Nissany |
| 2011/0075667 A1 | 3/2011 | Li et al. |
| 2011/0110382 A1 | 5/2011 | Jabr et al. |
| 2011/0116443 A1 | 5/2011 | Yu et al. |
| 2011/0126099 A1 | 5/2011 | Anderson et al. |
| 2011/0138055 A1 | 6/2011 | Daly et al. |
| 2011/0145413 A1 | 6/2011 | Dawson et al. |
| 2011/0145657 A1 | 6/2011 | Bishop et al. |
| 2011/0173303 A1 | 7/2011 | Rider |
| 2011/0179186 A1* | 7/2011 | Li .................. H04L 65/4084 709/231 |
| 2011/0185063 A1 | 7/2011 | Head et al. |
| 2011/0199902 A1 | 8/2011 | Leavy et al. |
| 2011/0213687 A1 | 9/2011 | Ferris et al. |
| 2011/0213966 A1 | 9/2011 | Fu et al. |
| 2011/0219434 A1 | 9/2011 | Betz et al. |
| 2011/0231715 A1 | 9/2011 | Kunii et al. |
| 2011/0231899 A1 | 9/2011 | Pulier et al. |
| 2011/0239039 A1 | 9/2011 | Dieffenbach et al. |
| 2011/0252327 A1 | 10/2011 | Awasthi et al. |
| 2011/0261811 A1 | 10/2011 | Battestilli et al. |
| 2011/0261828 A1 | 10/2011 | Smith |
| 2011/0276675 A1 | 11/2011 | Singh et al. |
| 2011/0276951 A1 | 11/2011 | Jain |
| 2011/0295998 A1 | 12/2011 | Ferris et al. |
| 2011/0305149 A1 | 12/2011 | Scott et al. |
| 2011/0307531 A1 | 12/2011 | Gaponenko et al. |
| 2011/0320870 A1 | 12/2011 | Kenigsberg et al. |
| 2012/0005724 A1 | 1/2012 | Lee |
| 2012/0023418 A1 | 1/2012 | Frields et al. |
| 2012/0054367 A1 | 3/2012 | Ramakrishnan et al. |
| 2012/0072318 A1 | 3/2012 | Akiyama et al. |
| 2012/0072578 A1 | 3/2012 | Alam |
| 2012/0072581 A1 | 3/2012 | Tung et al. |
| 2012/0072985 A1 | 3/2012 | Davne et al. |
| 2012/0072992 A1 | 3/2012 | Arasaratnam et al. |
| 2012/0084445 A1 | 4/2012 | Brock et al. |
| 2012/0084782 A1 | 4/2012 | Chou et al. |
| 2012/0096134 A1 | 4/2012 | Suit |
| 2012/0102193 A1 | 4/2012 | Rathore et al. |
| 2012/0102199 A1 | 4/2012 | Hopmann et al. |
| 2012/0131174 A1 | 5/2012 | Ferris et al. |
| 2012/0137215 A1 | 5/2012 | Kawara |
| 2012/0158967 A1 | 6/2012 | Sedayao et al. |
| 2012/0159097 A1 | 6/2012 | Jennas, II et al. |
| 2012/0166649 A1 | 6/2012 | Watanabe et al. |
| 2012/0167094 A1 | 6/2012 | Suit |
| 2012/0173541 A1 | 7/2012 | Venkataramani |
| 2012/0173710 A1 | 7/2012 | Rodriguez |
| 2012/0179909 A1 | 7/2012 | Sagi et al. |
| 2012/0180044 A1 | 7/2012 | Donnellan et al. |
| 2012/0182891 A1 | 7/2012 | Lee et al. |
| 2012/0185632 A1 | 7/2012 | Lais et al. |
| 2012/0185913 A1 | 7/2012 | Martinez et al. |
| 2012/0192016 A1 | 7/2012 | Gotesdyner et al. |
| 2012/0192075 A1 | 7/2012 | Ebtekar et al. |
| 2012/0201135 A1 | 8/2012 | Ding et al. |
| 2012/0203908 A1 | 8/2012 | Beaty et al. |
| 2012/0204169 A1 | 8/2012 | Breiter et al. |
| 2012/0204187 A1 | 8/2012 | Breiter et al. |
| 2012/0214506 A1 | 8/2012 | Skaaksrud et al. |
| 2012/0222106 A1 | 8/2012 | Kuehl |
| 2012/0236716 A1 | 9/2012 | Anbazhagan et al. |
| 2012/0240113 A1 | 9/2012 | Hur |
| 2012/0265976 A1 | 10/2012 | Spiers et al. |
| 2012/0272025 A1 | 10/2012 | Park et al. |
| 2012/0281706 A1 | 11/2012 | Agarwal et al. |
| 2012/0281708 A1 | 11/2012 | Chauhan et al. |
| 2012/0290647 A1 | 11/2012 | Ellison et al. |
| 2012/0297238 A1 | 11/2012 | Watson et al. |
| 2012/0311106 A1 | 12/2012 | Morgan |
| 2012/0311568 A1 | 12/2012 | Jansen |
| 2012/0324092 A1 | 12/2012 | Brown et al. |
| 2012/0324114 A1 | 12/2012 | Dutta et al. |
| 2013/0003567 A1 | 1/2013 | Gallant et al. |
| 2013/0013248 A1 | 1/2013 | Brugler et al. |
| 2013/0036213 A1 | 2/2013 | Hasan et al. |
| 2013/0044636 A1 | 2/2013 | Koponen et al. |
| 2013/0066940 A1 | 3/2013 | Shao |
| 2013/0069950 A1 | 3/2013 | Adam et al. |
| 2013/0080509 A1 | 3/2013 | Wang |
| 2013/0080624 A1 | 3/2013 | Nagai et al. |
| 2013/0091557 A1 | 4/2013 | Gurrapu |
| 2013/0097601 A1 | 4/2013 | Podvratnik et al. |
| 2013/0104140 A1 | 4/2013 | Meng et al. |
| 2013/0111540 A1 | 5/2013 | Sabin |
| 2013/0117337 A1 | 5/2013 | Dunham |
| 2013/0124712 A1 | 5/2013 | Parker |
| 2013/0125124 A1 | 5/2013 | Kempf et al. |
| 2013/0138816 A1 | 5/2013 | Kuo et al. |
| 2013/0144978 A1 | 6/2013 | Jain et al. |
| 2013/0152076 A1 | 6/2013 | Patel |
| 2013/0152175 A1 | 6/2013 | Hromoko et al. |
| 2013/0159097 A1 | 6/2013 | Schory et al. |
| 2013/0159496 A1 | 6/2013 | Hamilton et al. |
| 2013/0160008 A1 | 6/2013 | Cawlfield et al. |
| 2013/0162753 A1 | 6/2013 | Hendrickson et al. |
| 2013/0169666 A1 | 7/2013 | Pacheco et al. |
| 2013/0179941 A1 | 7/2013 | McGloin et al. |
| 2013/0182712 A1 | 7/2013 | Aguayo et al. |
| 2013/0185413 A1 | 7/2013 | Beaty et al. |
| 2013/0185433 A1 | 7/2013 | Zhu et al. |
| 2013/0191106 A1 | 7/2013 | Kephart et al. |
| 2013/0198050 A1 | 8/2013 | Shroff et al. |
| 2013/0198374 A1 | 8/2013 | Zalmanovitch et al. |
| 2013/0204849 A1 | 8/2013 | Chacko |
| 2013/0232491 A1 | 9/2013 | Radhakrishnan et al. |
| 2013/0232492 A1 | 9/2013 | Wang |
| 2013/0246588 A1 | 9/2013 | Borowicz et al. |
| 2013/0250770 A1 | 9/2013 | Zou et al. |
| 2013/0254415 A1 | 9/2013 | Fullen et al. |
| 2013/0262347 A1 | 10/2013 | Dodson |
| 2013/0283364 A1 | 10/2013 | Chang et al. |
| 2013/0297769 A1 | 11/2013 | Chang et al. |
| 2013/0318240 A1 | 11/2013 | Hebert et al. |
| 2013/0318546 A1 | 11/2013 | Kothuri et al. |
| 2013/0339949 A1 | 12/2013 | Spiers et al. |
| 2014/0006481 A1 | 1/2014 | Frey et al. |
| 2014/0006535 A1 | 1/2014 | Reddy |
| 2014/0006585 A1 | 1/2014 | Dunbar et al. |
| 2014/0019639 A1 | 1/2014 | Ueno |
| 2014/0040473 A1 | 2/2014 | Ho et al. |
| 2014/0040883 A1 | 2/2014 | Tompkins |
| 2014/0052877 A1 | 2/2014 | Mao |
| 2014/0059310 A1 | 2/2014 | Du et al. |
| 2014/0074850 A1 | 3/2014 | Noel et al. |
| 2014/0075048 A1 | 3/2014 | Yuksel et al. |

(56) References Cited

U.S. PATENT DOCUMENTS

| | | |
|---|---|---|
| 2014/0075108 A1 | 3/2014 | Dong et al. |
| 2014/0075357 A1 | 3/2014 | Flores et al. |
| 2014/0075501 A1 | 3/2014 | Srinivasan et al. |
| 2014/0089727 A1 | 3/2014 | Cherkasova et al. |
| 2014/0098762 A1 | 4/2014 | Ghai et al. |
| 2014/0108985 A1 | 4/2014 | Scott et al. |
| 2014/0122560 A1 | 5/2014 | Ramey et al. |
| 2014/0136779 A1 | 5/2014 | Guha et al. |
| 2014/0140211 A1 | 5/2014 | Chandrasekaran et al. |
| 2014/0141720 A1 | 5/2014 | Princen et al. |
| 2014/0156557 A1 | 6/2014 | Zeng et al. |
| 2014/0160924 A1 | 6/2014 | Pfautz et al. |
| 2014/0164486 A1 | 6/2014 | Ravichandran et al. |
| 2014/0188825 A1 | 7/2014 | Muthukkaruppan et al. |
| 2014/0189095 A1 | 7/2014 | Lindberg et al. |
| 2014/0189125 A1 | 7/2014 | Amies et al. |
| 2014/0215471 A1 | 7/2014 | Cherkasova |
| 2014/0222953 A1 | 8/2014 | Karve et al. |
| 2014/0244851 A1 | 8/2014 | Lee |
| 2014/0245298 A1 | 8/2014 | Zhou et al. |
| 2014/0269266 A1 | 9/2014 | Filsfils et al. |
| 2014/0280805 A1 | 9/2014 | Sawalha |
| 2014/0282536 A1 | 9/2014 | Dave et al. |
| 2014/0282611 A1 | 9/2014 | Campbell et al. |
| 2014/0282669 A1 | 9/2014 | McMillan |
| 2014/0282889 A1 | 9/2014 | Ishaya et al. |
| 2014/0289200 A1 | 9/2014 | Kato |
| 2014/0297569 A1 | 10/2014 | Clark et al. |
| 2014/0297835 A1 | 10/2014 | Buys |
| 2014/0314078 A1 | 10/2014 | Jilani |
| 2014/0317261 A1 | 10/2014 | Shatzkamer et al. |
| 2014/0366155 A1 | 12/2014 | Chang et al. |
| 2014/0372567 A1 | 12/2014 | Ganesh et al. |
| 2015/0006470 A1 | 1/2015 | Mohan |
| 2015/0033086 A1 | 1/2015 | Sasturkar et al. |
| 2015/0043335 A1 | 2/2015 | Testicioglu et al. |
| 2015/0043576 A1 | 2/2015 | Dixon et al. |
| 2015/0052247 A1 | 2/2015 | Threefoot et al. |
| 2015/0052517 A1 | 2/2015 | Raghu et al. |
| 2015/0058382 A1 | 2/2015 | St. Laurent et al. |
| 2015/0058459 A1 | 2/2015 | Amendjian et al. |
| 2015/0058557 A1 | 2/2015 | Madhusudana et al. |
| 2015/0070516 A1 | 3/2015 | Shoemake et al. |
| 2015/0071285 A1 | 3/2015 | Kumar et al. |
| 2015/0089478 A1 | 3/2015 | Cheluvaraju et al. |
| 2015/0100471 A1 | 4/2015 | Curry, Jr. et al. |
| 2015/0106802 A1 | 4/2015 | Ivanov, IV et al. |
| 2015/0106805 A1 | 4/2015 | Melander et al. |
| 2015/0109923 A1 | 4/2015 | Hwang |
| 2015/0117199 A1 | 4/2015 | Chinnaiah Sankaran et al. |
| 2015/0117458 A1 | 4/2015 | Gurkan et al. |
| 2015/0120914 A1 | 4/2015 | Wada et al. |
| 2015/0149828 A1 | 5/2015 | Mukerji et al. |
| 2015/0178133 A1 | 6/2015 | Phelan et al. |
| 2015/0215819 A1 | 7/2015 | Bosch et al. |
| 2015/0227405 A1 | 8/2015 | Jan et al. |
| 2015/0242204 A1 | 8/2015 | Hassine et al. |
| 2015/0249709 A1 | 9/2015 | Teng et al. |
| 2015/0271199 A1 | 9/2015 | Bradley et al. |
| 2015/0280980 A1 | 10/2015 | Bitar |
| 2015/0281067 A1 | 10/2015 | Wu |
| 2015/0281113 A1 | 10/2015 | Siciliano et al. |
| 2015/0309908 A1 | 10/2015 | Pearson et al. |
| 2015/0319063 A1 | 11/2015 | Zourzouvillys et al. |
| 2015/0326524 A1 | 11/2015 | Tankala et al. |
| 2015/0339210 A1 | 11/2015 | Kopp et al. |
| 2015/0373108 A1 | 12/2015 | Fleming et al. |
| 2015/0379062 A1 | 12/2015 | Vermeulen et al. |
| 2016/0011925 A1 | 1/2016 | Kulkarni et al. |
| 2016/0013990 A1 | 1/2016 | Kulkarni et al. |
| 2016/0062786 A1 | 3/2016 | Meng et al. |
| 2016/0065417 A1 | 3/2016 | Sapuram et al. |
| 2016/0094398 A1 | 3/2016 | Choudhury et al. |
| 2016/0094480 A1 | 3/2016 | Kulkarni et al. |
| 2016/0094643 A1 | 3/2016 | Jain et al. |
| 2016/0094894 A1 | 3/2016 | Inayatullah et al. |
| 2016/0099847 A1 | 4/2016 | Melander et al. |
| 2016/0099873 A1 | 4/2016 | Gerö et al. |
| 2016/0103838 A1 | 4/2016 | Sainani et al. |
| 2016/0105393 A1 | 4/2016 | Thakkar et al. |
| 2016/0127184 A1 | 5/2016 | Bursell |
| 2016/0134557 A1 | 5/2016 | Steinder et al. |
| 2016/0147676 A1 | 5/2016 | Cha et al. |
| 2016/0162436 A1 | 6/2016 | Raghavan et al. |
| 2016/0164914 A1 | 6/2016 | Madhav et al. |
| 2016/0188527 A1 | 6/2016 | Cherian et al. |
| 2016/0234071 A1 | 8/2016 | Nambiar et al. |
| 2016/0239399 A1 | 8/2016 | Babu et al. |
| 2016/0253078 A1 | 9/2016 | Ebtekar et al. |
| 2016/0254968 A1 | 9/2016 | Ebtekar et al. |
| 2016/0261564 A1 | 9/2016 | Foxhoven et al. |
| 2016/0277368 A1 | 9/2016 | Narayanaswamy et al. |
| 2016/0292611 A1 | 10/2016 | Boe et al. |
| 2016/0352682 A1 | 12/2016 | Chang |
| 2016/0378389 A1 | 12/2016 | Hrischuk et al. |
| 2016/0378518 A1* | 12/2016 | Antony .............. G06F 9/4856 718/1 |
| 2017/0005948 A1 | 1/2017 | Melander et al. |
| 2017/0024260 A1 | 1/2017 | Chandrasekaran et al. |
| 2017/0026470 A1 | 1/2017 | Bhargava et al. |
| 2017/0034199 A1 | 2/2017 | Zaw |
| 2017/0041342 A1 | 2/2017 | Efremov et al. |
| 2017/0054659 A1 | 2/2017 | Ergin et al. |
| 2017/0063674 A1 | 3/2017 | Maskalik et al. |
| 2017/0097841 A1 | 4/2017 | Chang et al. |
| 2017/0099188 A1 | 4/2017 | Chang et al. |
| 2017/0104755 A1 | 4/2017 | Arregoces et al. |
| 2017/0126583 A1 | 5/2017 | Xia |
| 2017/0147297 A1 | 5/2017 | Krishnamurthy et al. |
| 2017/0163569 A1 | 6/2017 | Koganti |
| 2017/0171158 A1 | 6/2017 | Hoy et al. |
| 2017/0192823 A1 | 7/2017 | Karaje et al. |
| 2017/0264663 A1 | 9/2017 | Bicket et al. |
| 2017/0302521 A1 | 10/2017 | Lui et al. |
| 2017/0310556 A1 | 10/2017 | Knowles et al. |
| 2017/0317932 A1 | 11/2017 | Paramasivam |
| 2017/0339070 A1 | 11/2017 | Chang et al. |
| 2017/0371910 A1* | 12/2017 | Joo .................... G06F 16/2329 |
| 2018/0069885 A1 | 3/2018 | Patterson et al. |
| 2018/0173372 A1 | 6/2018 | Greenspan et al. |
| 2018/0174060 A1 | 6/2018 | Velez-Rojas et al. |

FOREIGN PATENT DOCUMENTS

| | | |
|---|---|---|
| CN | 102164091 | 8/2011 |
| CN | 104320342 | 1/2015 |
| CN | 105740084 | 7/2016 |
| EP | 2228719 | 9/2010 |
| EP | 2439637 | 4/2012 |
| EP | 2645253 | 11/2014 |
| KR | 10-2015-0070676 | 5/2015 |
| TW | 394537 | 12/2010 |
| WO | WO 2009/155574 | 12/2009 |
| WO | WO 2010/030915 | 3/2010 |
| WO | WO 2013/158707 | 10/2013 |

OTHER PUBLICATIONS

Bittencourtetal., "Towards Virtual Machine Migration in Fog Computing," 2015 10th International Conference on P2P, Parallel, Grid, Cloud and Internet Computing (3PGCIC), Krakow, 2015, pp. 1-8. (Year: 2015).*

International Search Report and Written Opinion from the International Searching Authority, dated Sep. 18, 2017, 13 pages, for International Application No. PCT/US2017/044437, which corresponds to related matter, U.S. Appl. No. 15/289,755.

Author Unknown, "5 Benefits of a Storage Gateway in the Cloud," Blog, TwinStrata, Inc., Jul. 25, 2012, XP055141645, 4 pages, https://web.archive.org/web/20120725092619/http://blog.twinstrata.com/2012/07/10//5-benefits-of-a-storage-gateway-in-the-cloud.

(56) References Cited

OTHER PUBLICATIONS

Author Unknown, "Joint Cisco and VMWare Solution for Optimizing Virtual Desktop Delivery: Data Center 3.0: Solutions to Accelerate Data Center Virtualization," Cisco Systems, Inc. and VMware, Inc., Sep. 2008, 10 pages.
Author Unknown, "Open Data Center Alliance Usage: Virtual Machine (VM) Interoperability in a Hybrid Cloud Environment Rev. 1.2," Open Data Center Alliance, Inc., 2013, 18 pages.
Author Unknown, "Real-Time Performance Monitoring on Juniper Networks Devices, Tips and Tools for Assessing and Analyzing Network Efficiency," Juniper Networks, Inc., May 2010, 35 pages.
Beyer, Steffen, "Module "Data::Locations?!"," YAPC::Europe, London, UK,ICA, Sep. 22-24, 2000, XP002742700, 15 pages.
Borovick, Lucinda, et al., "Architecting the Network for the Cloud," IDC White Paper, Jan. 2011, 8 pages.
Bosch, Greg, "Virtualization," last modified Apr. 2012 by B. Davison, 33 pages.
Broadcasters Audience Research Board, "What's Next," http://Iwww.barb.co.uk/whats-next, accessed Jul. 22, 2015, 2 pages.
Cisco Systems, Inc. "Best Practices in Deploying Cisco Nexus 1000V Series Switches on Cisco UCS B and C Series Cisco UCS Manager Servers," Cisco White Paper, Apr. 2011, 36 pages, http://www.cisco.com/en/US/prod/collateral/switches/ps9441/ps9902/white_paper_c11-558242.pdf.
Cisco Systems, Inc., "Cisco Unified Network Services: Overcome Obstacles to Cloud-Ready Deployments," Cisco White Paper, Jan. 2011, 6 pages.
Cisco Systems, Inc., "Cisco Intercloud Fabric: Hybrid Cloud with Choice, Consistency, Control and Compliance," Dec. 10, 2014, 22 pages.
Cisco Technology, Inc., "Cisco Expands Videoscape TV Platform Into the Cloud," Jan. 6, 2014, Las Vegas, Nevada, Press Release, 3 pages.
CSS Corp, "Enterprise Cloud Gateway (ECG)—Policy driven framework for managing multi-cloud environments," original published on or about Feb. 11, 2012; 1 page; http://www.css-cloud.com/platform/enterprise-cloud-qateway.php.
Fang K., "LISP MAC-EID-TO-RLOC Mapping (LISP based L2VPN)," Network Working Group, Internet Draft, CISCO Systems, Jan. 2012, 12 pages.
Herry, William, "Keep It Simple, Stupid: OpenStack nova-scheduler and its algorithm", May 12, 2012, IBM, 12 pages.
Hewlett-Packard Company, "Virtual context management on network devices", Research Disclosure, vol. 564, No. 60, Apr. 1, 2011, Mason Publications, Hampshire, GB, Apr. 1, 2011, 524.
Juniper Networks, Inc., "Recreating Real Application Traffic in Junosphere Lab," Solution Brief, Dec. 2011, 3 pages.
Kenhui, "Musings on Cloud Computing and IT-as-a-Service: [Updated for Havana] Openstack Computer for VSphere Admins, Part 2: Nova-Scheduler and DRS", Jun. 26, 2013, Cloud Architect Musings, 12 pages.
Kolyshkin, Kirill, "Virtualization in Linux," Sep. 1, 2006, XP055141648, 5 pages, https://web.archive.org/web/20070120205111/http://download.openvz.org/doc/openvz-intro.pdf.
Lerach, S.R.O., "Golem," http://www.lerach.cz/en/products/golem/, accessed Jul. 22, 2015, 2 pages.
Linthicum, David, "VM Import could be a game changer for hybrid clouds", InfoWorld, Dec. 23, 2010, 4 pages.
Naik, Vijay K., et al., "Harmony: A Desktop Grid for Delivering Enterprise Computations," Grid Computing, 2003, Fourth International Workshop on Proceedings, Nov. 17, 2003, pp. 1-11.
Nair, Srijith K. et al., "Towards Secure Cloud Bursting, Brokerage and Aggregation," 2012, 8 pages, www.flexiant.com.
Nielsen, "SimMetry Audience Measurement—Technology," http://www.nielsen-admosphere.eu/products-and-services/simmetry-audience-measurement-technology/, accessed Jul. 22, 2015, 6 pages.
Nielsen, "Television " http://www.nielsen.com/us/en/solutions/measurement/television.html, accessed Jul. 22, 2015, 4 pages.
Open Stack, "Filter Scheduler," updated Dec. 17, 2017, 5 pages, accessed on Dec. 18, 2017, https://docs.openstack.org/nova/latest/user/filter-scheduler.html.
Rabadan, J., et al., "Operational Aspects of Proxy-ARP/ND in EVPN Networks," BESS Worksgroup Internet Draft, draft-snr-bess-evpn-proxy-arp-nd-02, Oct. 6, 2015, 22 pages.
Saidi, Ali, et al., "Performance Validation of Network-Intensive Workloads on a Full-System Simulator," Interaction between Operating System and Computer Architecture Workshop, (IOSCA 2005), Austin, Texas, Oct. 2005, 10 pages.
Shunra, "Shunra for HP Software; Enabling Confidence in Application Performance Before Deployment," 2010, 2 pages.
Son, Jungmin, "Automatic decision system for efficient resource selection and allocation in inter-clouds," Jun. 2013, 35 pages.
Wikipedia, "Filter (software)", Wikipedia, Feb. 8, 2014, 2 pages, https://en.wikipedia.org/w/index.php?title=Filter_%28software%29&oldid=594544359.
Wikipedia; "Pipeline (Unix)", Wikipedia, May 4, 2014, 4 pages, https://en.wikipedia.org/w/index.php?title=Pipeline2/028Unix%29&oldid=606980114.
Amedro, Brian, et al., "An Efficient Framework for Running Applications on Clusters, Grids and Cloud," 2010, 17 pages.
Author Unknown, "A Look at DeltaCloud: The Multi-Cloud API," Feb. 17, 2012, 4 pages.
Author Unknown, "About Deltacloud," Apache Software Foundation, Aug. 18, 2013, 1 page.
Author Unknown, "Architecture for Managing Clouds, A White Paper from the Open Cloud Standards Incubator," Version 1.0.0, Document No. DSP-IS0102, Jun. 18, 2010, 57 pages.
Author Unknown, "Cloud Infrastructure Management Interface—Common Information Model (CIMI-CIM)," Document No. DSP0264, Version 1.0.0, Dec. 14, 2012, 21 pages.
Author Unknown, "Cloud Infrastructure Management Interface (CIMI) Primer," Document No. DSP2027, Version 1.0.1, Sep. 12, 2012, 30 pages.
Author Unknown, "cloudControl Documentation," Aug. 25, 2013, 14 pages.
Author Unknown, "Interoperable Clouds, A White Paper from the Open Cloud Standards Incubator," Version 1.0.0, Document No. DSP-IS0101, Nov. 11, 2009, 21 pages.
Author Unknown, "Microsoft Cloud Edge Gateway (MCE) Series Appliance," Iron Networks, Inc., 2014, 4 pages.
Author Unknown, "Use Cases and Interactions for Managing Clouds, A White Paper from the Open Cloud Standards Incubator," Version 1.0.0, Document No. DSP-IS00103, Jun. 16, 2010, 75 pages.
Author Unknown, "Apache Ambari Meetup What's New," Hortonworks Inc., Sep. 2013, 28 pages.
Author Unknown, "Introduction," Apache Ambari project, Apache Software Foundation, 2014, 1 page.
Citrix, "Citrix StoreFront 2.0" White Paper, Proof of Concept Implementation Guide, Citrix Systems, Inc., 2013, 48 pages.
Citrix, "CloudBridge for Microsoft Azure Deployment Guide," 30 pages.
Citrix, "Deployment Practices and Guidelines for NetScaler 10.5 on Amazon Web Services," White Paper, citrix.com, 2014, 14 pages.
Gedymin, Adam, "Cloud Computing with an emphasis on Google App Engine," Sep. 2011, 146 pages.
Good, Nathan A., "Use Apache Deltacloud to administer multiple instances with a single API," Dec. 17, 2012, 7 pages.
Kunz, Thomas, et al., "OmniCloud—The Secure and Flexible Use of Cloud Storage Services," 2014, 30 pages.
Logan, Marcus, "Hybrid Cloud Application Architecture for Elastic Java-Based Web Applications," F5 Deployment Guide Version 1.1, 2016, 65 pages.
Lynch, Sean, "Monitoring cache with Claspin" Facebook Engineering, Sep. 19, 2012, 5 pages.
Meireles, Fernando Miguel Dias, "Integrated Management of Cloud Computing Resources," 2013-2014, 286 pages.
Mu, Shuai, et al., "uLibCloud: Providing High Available and Uniform Accessing to Multiple Cloud Storages," 2012 IEEE, 8 pages.

(56) References Cited

OTHER PUBLICATIONS

Sun, Aobing, et al., "IaaS Public Cloud Computing Platform Scheduling Model and Optimization Analysis," Int. J. Communications, Network and System Sciences, 2011, 4, 803-811, 9 pages.

Szymaniak, Michal, et al., "Latency-Driven Replica Placement", vol. 47 No. 8, IPSJ Journal, Aug. 2006, 12 pages.

Toews, Everett, "Introduction to Apache jclouds," Apr. 7, 2014, 23 pages.

Von Laszewski, Gregor, et al., "Design of a Dynamic Provisioning System for a Federated Cloud and Bare-metal Environment," 2012, 8 pages.

Ye, Xianglong, et al., "A Novel Blocks Placement Strategy for Hadoop," 2012 IEEE/ACTS 11$^{th}$ International Conference on Computer and Information Science, 2012 IEEE, 5 pages.

Al-Harbi, S.H., et al., "Adapting $k$-means for supervised clustering," Jun. 2006, Applied Intelligence, vol. 24, Issue 3, pp. 219-226.

Bohner, Shawn A., "Extending Software Change Impact Analysis into COTS Components," 2003, IEEE, 8 pages.

Hood, C. S., et al., "Automated Proactive Anomaly Detection," 1997, Springer Science and Business Media Dordrecht, pp. 688-699.

Vilalta R., et al., "An efficient approach to external cluster assessment with an application to martian topography," Feb. 2007, 23 pages, Data Mining and Knowledge Discovery 14.1: 1-23. New York: Springer Science & Business Media.

\* cited by examiner

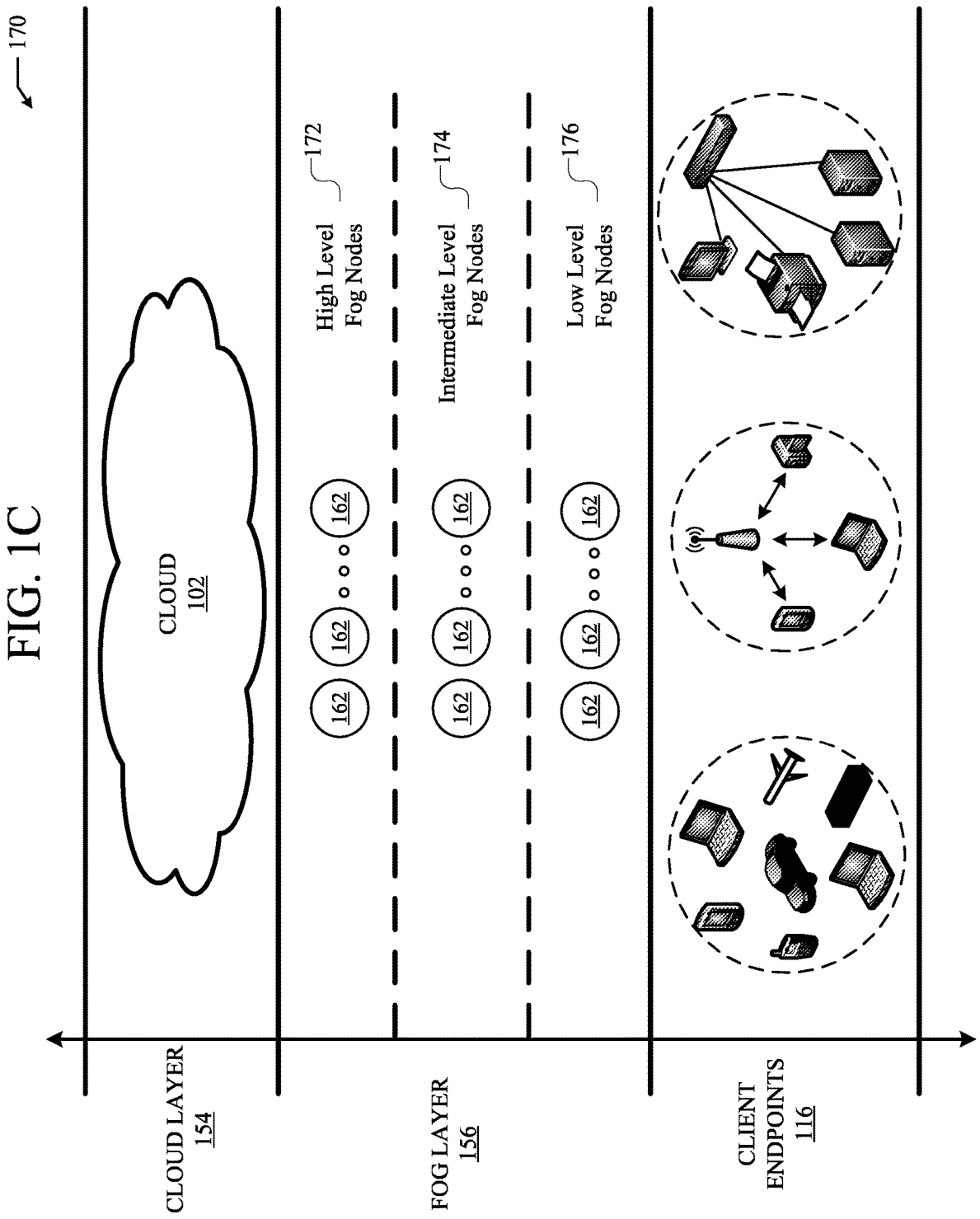

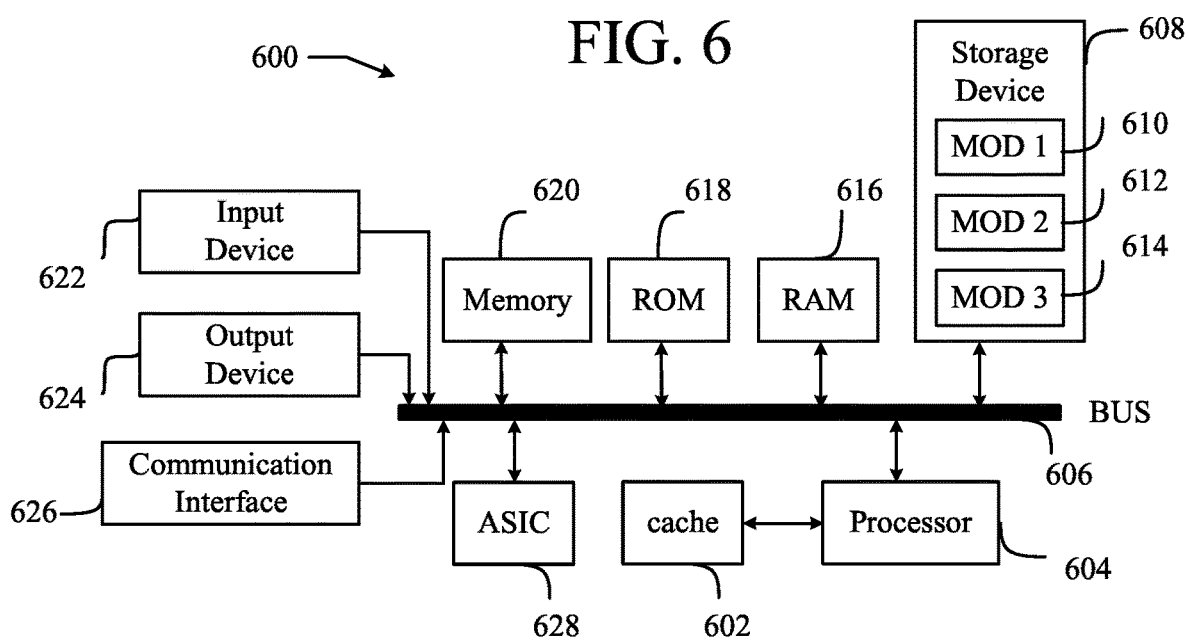

ORCHESTRATION OF CLOUD AND FOG INTERACTIONS

CROSS-REFERENCE TO RELATED APPLICATIONS

This application is related to U.S. application Ser. No. 15/289,755, filed Oct. 10, 2016, and entitled "ORCHESTRATION SYSTEM FOR MIGRATING USER DATA AND SERVICES BASED ON USER INFORMATION," the contents which are explicitly incorporated herein in their entirety.

TECHNICAL FIELD

The present technology pertains to cloud and data center orchestration systems, and more specifically, orchestration of cloud and fog interactions during events such as overloads, failures, or security events.

BACKGROUND

As a result of globalization and computing mobility, users may require reliable and quick access to network data at different times and from a wide range of locations, in order to complete their tasks and business objectives. Cloud computing enables users to access data and services on "the cloud" through the Internet from anywhere in the world. Not surprisingly, the cloud has become an integral part of our lives, as it hosts and provisions a large and increasing number of services ranging from entertainment services to productivity services to infrastructure services. Service requirements and customer expectations for cloud services are similarly diverse—all varying greatly from service to service and user to user.

To meet the exceeding demands for service quality and diversity, fog computing has emerged as an extension of cloud computing. Fog computing allows services or data from the cloud to be offloaded to "the fog". The fog can include nodes that are geographically and/or logically closer to client devices. The closer proximity of the fog to client devices can result in a reduction in latency and an increase in security and reliability for data and services hosted by the fog nodes. The fog and cloud can enable providers to balance the benefits of the cloud, such as scalability and flexibility, with the benefits of the fog, such as lower latency and better security. However, the fog-cloud architecture can also add a significant amount of complexity for providers and increase the potential points of failure for a service. In some cases, this can negatively impact service reliability and degrade the user experience.

Orchestration is the process whereby the resources of a complex network are allocated, configured, and managed. Orchestration is well known in the cloud, but is an emerging capability of fog systems. Fog orchestration poses unique challenges due to the hierarchical nature of the fog, its diverse set of resources, and widely distributed physical and logical geography. Achieving efficient and secure interaction between the cloud and levels of the fog is a particularly important capability.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 1C illustrates a diagram of an example hierarchical cloud and fog architecture;

FIG. 6 illustrates an example system embodiment.

DESCRIPTION OF EXAMPLE EMBODIMENTS

Figure 1A:
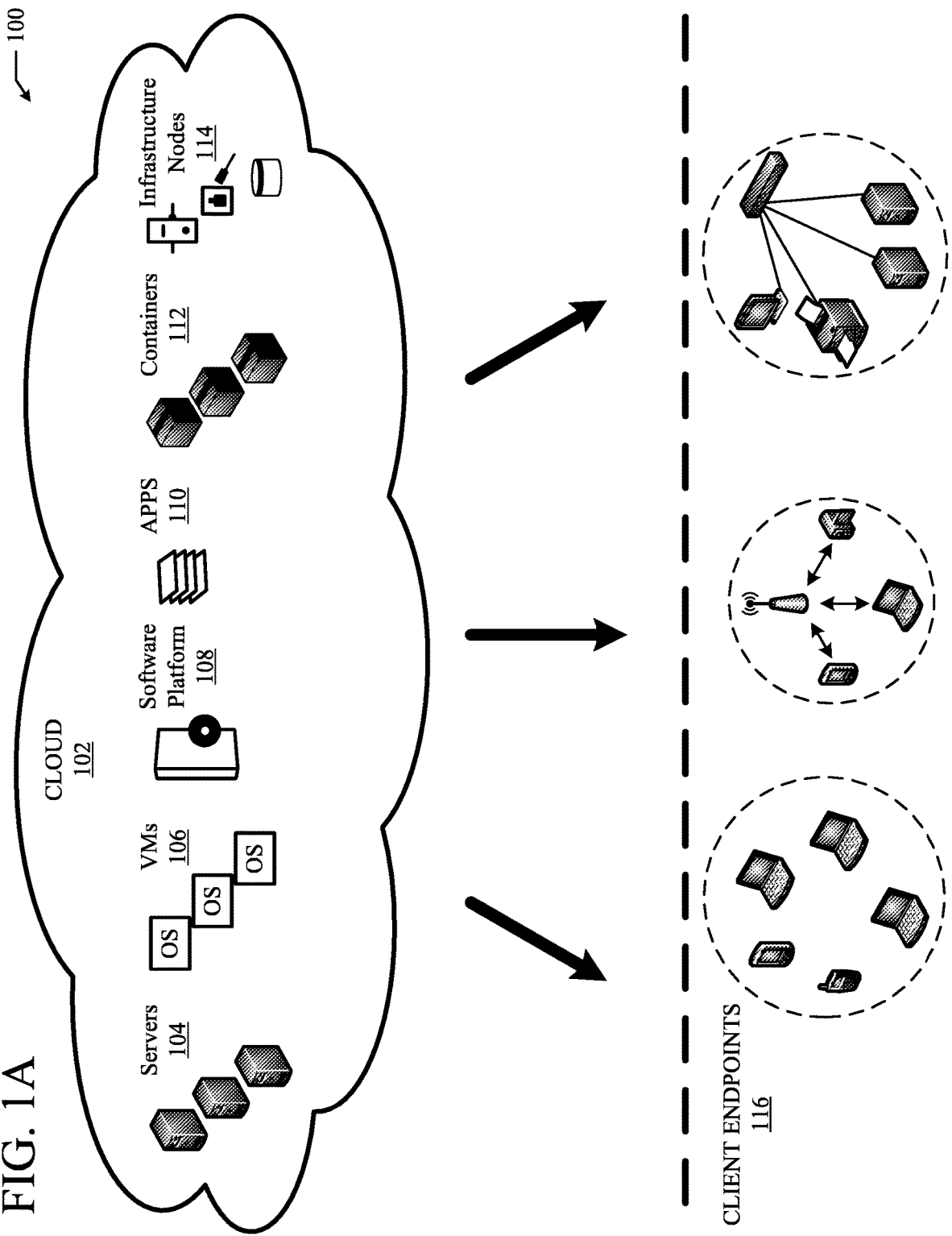
FIG. 1A illustrates a diagram of an example cloud computing architecture.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The cloud and fog layers of a network can add complexity and points of failure to the services provisioned by the network. This can negatively impact service performance and reliability and the overall user experience. Effective and efficient orchestration mechanisms can greatly improve the service performance and reliability, as well as the user experience, in cloud and fog computing.

Disclosed herein are systems, methods, and computer-readable media for orchestrating cloud to fog interactions. The approaches set forth herein can provide effective, efficient, and intelligent orchestration of services, nodes, and workloads between cloud and fog layers in a network. Such careful orchestration can result in significant improvements in performance, reliability, and efficiency. The orchestration can be as fine-grained, dynamic, and responsive as necessary for each particular application or context.

To illustrate, in some examples, a method can involve partitioning an application into software containers. Each of the software containers can be configured to host a respective component of the application, such as a service, a function, a workload, a resource, code, etc. For example, an application suite can be divided by functions and each of the functions can be hosted on one or more specific software containers.

The method can further involve identifying nodes on respective layers of a hierarchical cloud-fog architecture for hosting the software containers. The hierarchical cloud-fog architecture can include one or more cloud layers and one or more fog layers. For example, the hierarchical cloud-fog architecture can include a cloud layer and a fog layer containing multiple sub-layers. The various layers can include a hierarchy. For example, the fog layer can include a lower sub-layer, an intermediate sub-layer, and a high sub-layer. Similarly, the cloud can include a high sub-layer and a low sub-layer. The hierarchy can be based on logical or physical proximity to a reference point, such as the cloud, the users, the client endpoints, the local area networks, etc. The hierarchy can also be based on other factors, for example, relative performance, relative bandwidth, relative resources, relative cost, etc. Finally, the hierarchy can follow the natural boundaries of an application, for example placing local, neighborhood, and regional hierarchy layers of fog nodes in a smart city, or having machine, manufacturing cell and assembly line layers of fog nodes in a smart factory.

The method can also involve deploying the software containers at the nodes on the respective hierarchical layers of the cloud-fog architecture. Each of the software containers can be deployed to a respective layer from the cloud-fog architecture, such as a cloud layer, a fog sub-layer, etc. The software containers can be deployed at respective nodes selected based on one or more specific factors, such as capacity, security, resource availability, performance, status, cost, proximity, etc. The specific factors used for mapping software containers to respective nodes can be considered individually, separately, or relative to each other for example.

Description

The disclosed technology addresses the need in the art for orchestration of cloud and fog interactions. The present technology involves system, methods, and computer-readable media for efficiently and effectively orchestrating cloud and fog interactions during an event, such as an overload, a failure, a security event, etc.

Figure 1B:
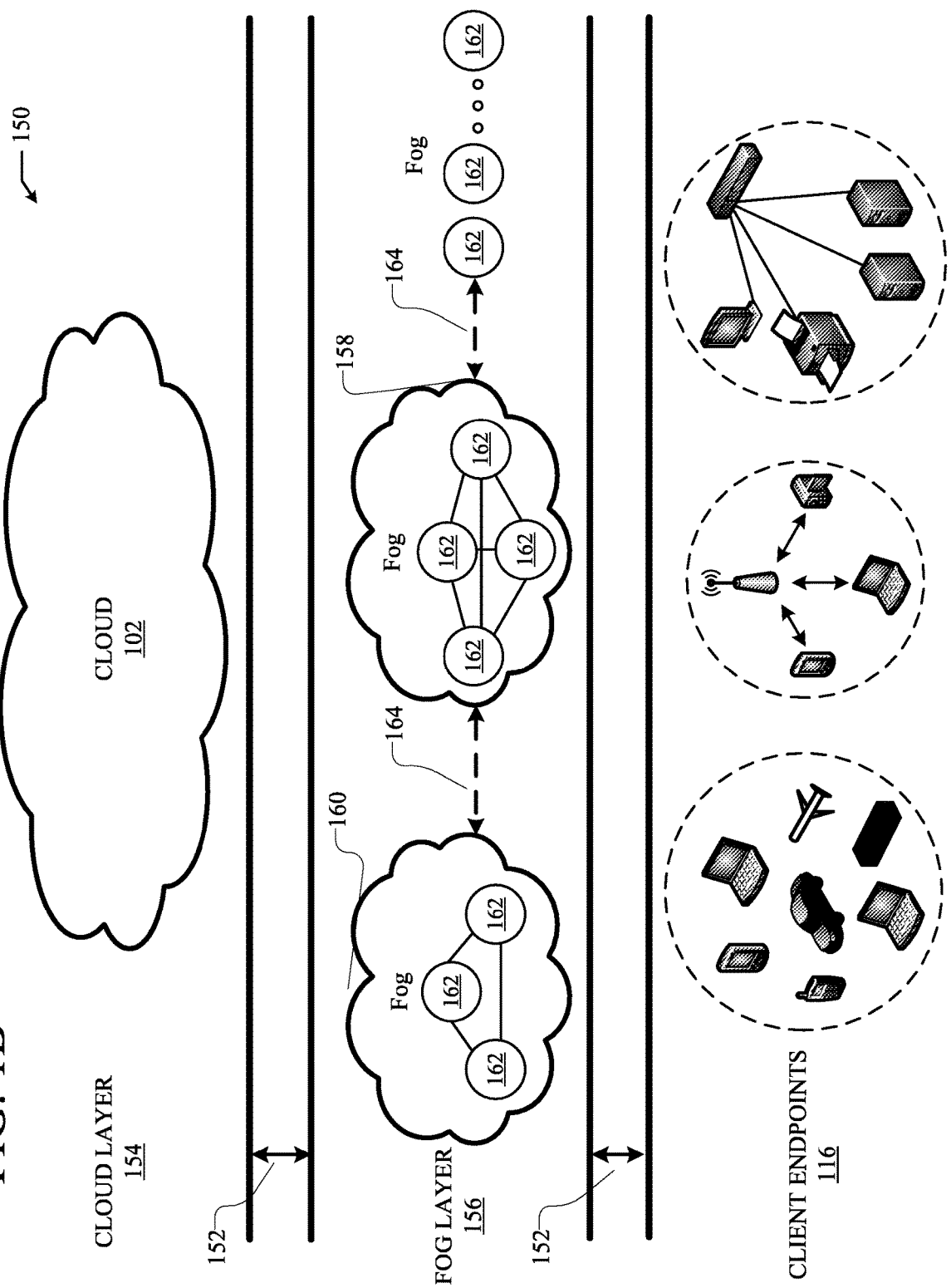
FIG. 1B illustrates a diagram of an example cloud and fog computing architecture.
Figure 3:
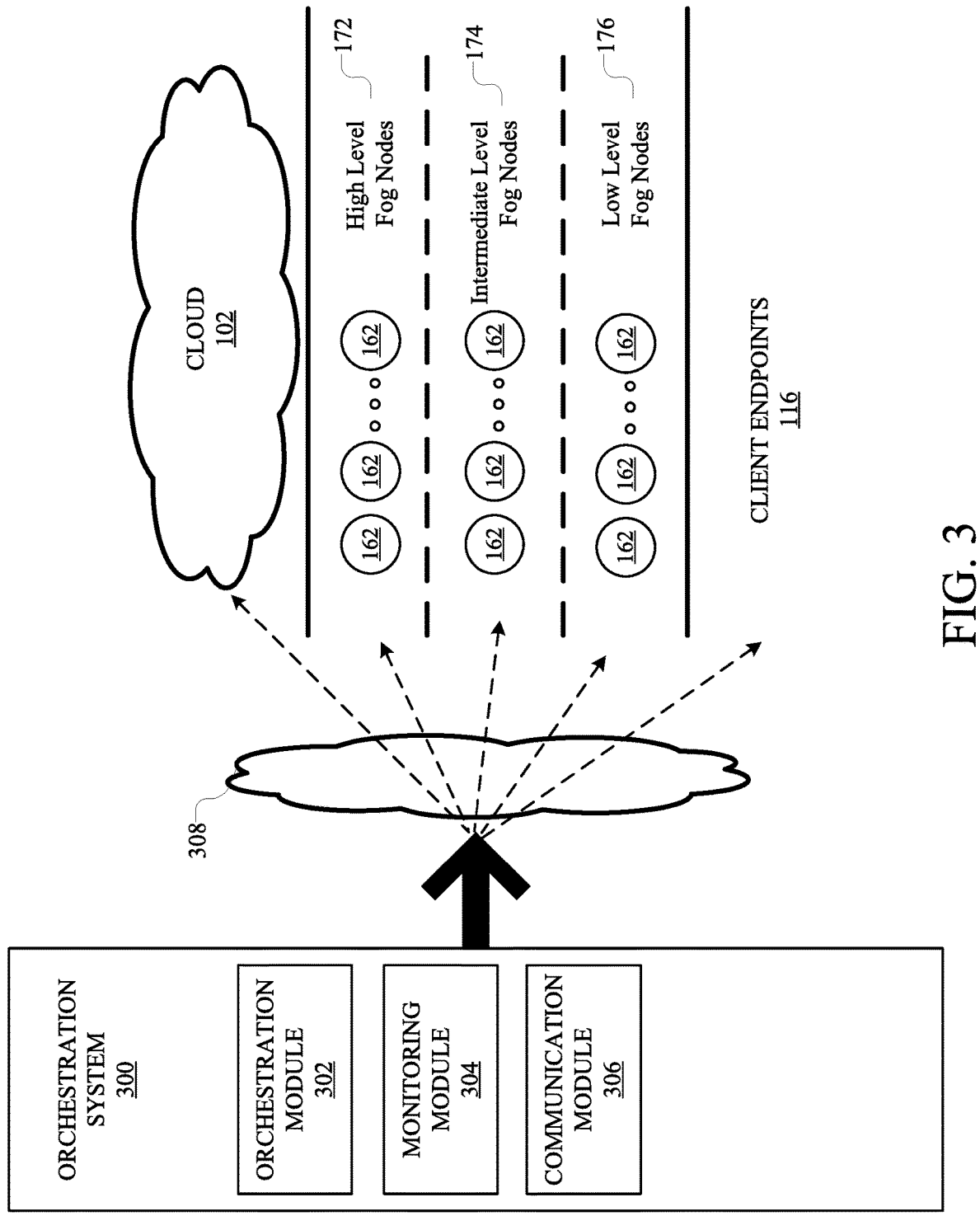
FIG. 3 illustrates a schematic diagram of an example orchestration system.
Figure 4:
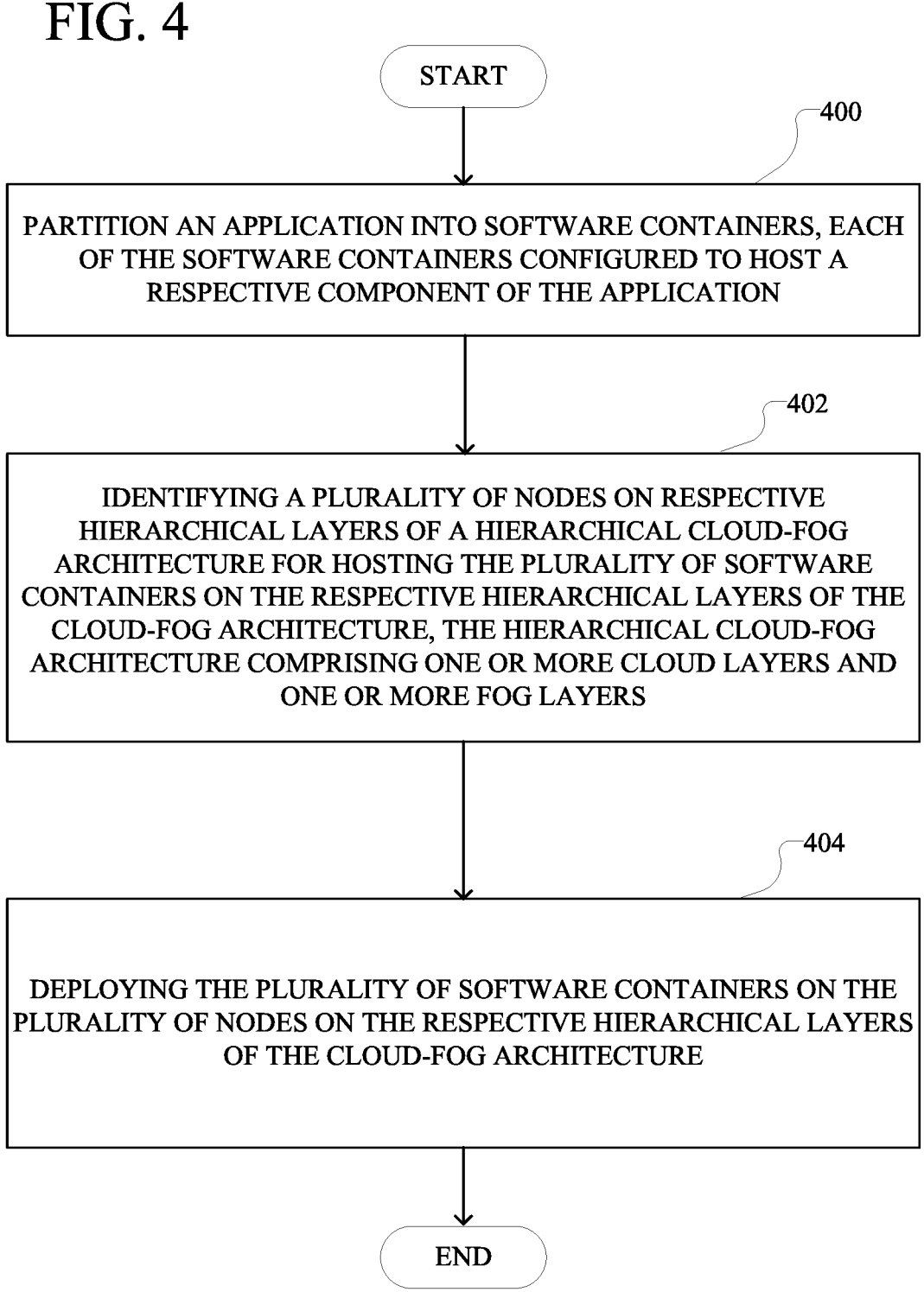
FIG. 4 illustrates an example method for orchestrating cloud and fog interactions.
Figure 5:
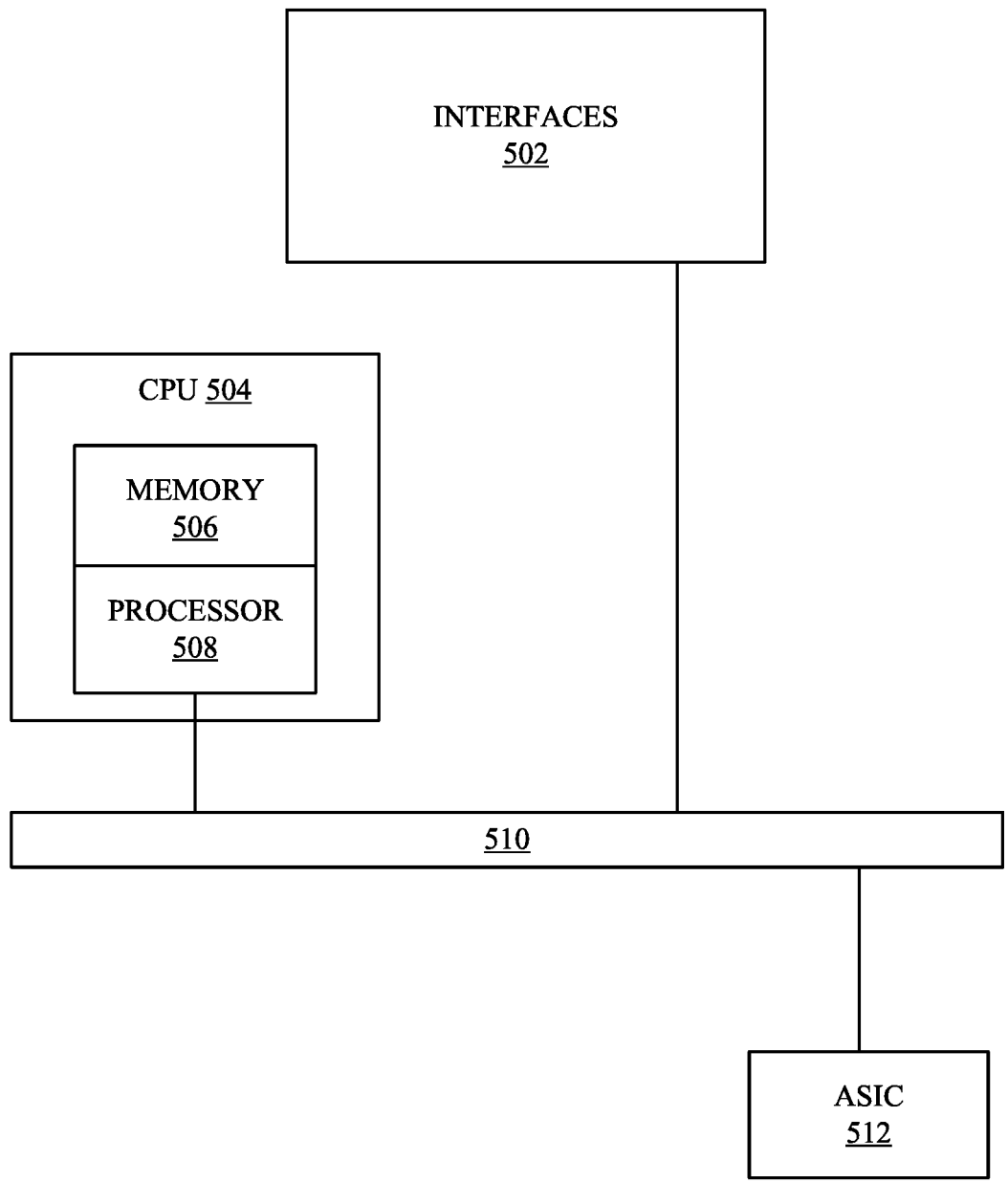
FIG. 5 illustrates an example network device in accordance with various embodiments.

A description of example cloud and fog network architectures, as illustrated in FIGS. 1A, 1B, and 1C, is first disclosed herein. A discussion of mechanisms for orchestrating cloud and fog interactions, as illustrated in FIGS. 2-4, will then follow. The discussion then concludes with a brief description of example devices, as illustrated in FIGS. 5 and 6A-B. These variations shall be described herein as the various embodiments are set forth. The disclosure now turns to FIG. 1A.

FIG. 1A illustrates a diagram of an example cloud computing architecture 100. The architecture 100 can include cloud 102. The cloud 102 can include one or more private clouds, public clouds, and/or hybrid clouds. Moreover, the cloud 102 can include cloud elements 104-114. The cloud elements 104-114 can include, for example, servers 104, virtual machines (VMs) 106, one or more software platforms 108, applications or services 110, software/data containers 112, and infrastructure nodes 114. The infrastructure nodes 114 can include various types of nodes, such as compute nodes, storage nodes, network nodes, management systems, etc.

The cloud 102 can provide various cloud computing services via the cloud elements 104-114, such as software as a service (SaaS) (e.g., collaboration services, email services, enterprise resource planning services, content services, communication services, etc.), infrastructure as a service (IaaS) (e.g., security services, networking services, systems management services, etc.), platform as a service (PaaS) (e.g., web services, streaming services, application development services, etc.), and other types of services such as desktop as a service (DaaS), information technology management as a service (ITaaS), managed software as a service (MSaaS), mobile backend as a service (MBaaS), etc.

The client endpoints 116 can connect with the cloud 102 to obtain one or more specific services from the cloud 102. The client endpoints 116 can communicate with elements 104-114 via one or more public networks (e.g., Internet), private networks, and/or hybrid networks (e.g., virtual private network). The client endpoints 116 can include any device with networking capabilities, such as a laptop computer, a tablet computer, a server, a desktop computer, a smartphone, a network device (e.g., an access point, a router, a switch, etc.), a smart television, a smart car, a sensor, a GPS device, a game system, a smart wearable object (e.g., smartwatch, etc.), a consumer object (e.g., Internet refrigerator, smart lighting system, etc.), a city or transportation system (e.g., traffic control, toll collection system, etc.), an internet of things (IoT) device, a camera, a network printer, a transportation system (e.g., airplane, train, motorcycle, boat, etc.), or any smart or connected object (e.g., smart home, smart building, smart retail, smart glasses, etc.), and so forth.

FIG. 1B illustrates a diagram of an example cloud and fog computing architecture 150. The cloud and fog computing architecture 150 can include the cloud layer 154, which includes cloud 102 and any other cloud system or environment, and the fog layer 156, which includes fog nodes 162. The client endpoints 116 can communicate with the cloud layer 154 and/or the fog layer 156 via a network. The architecture 150 can include one or more communication links 152 between the cloud layer 154, the fog layer 156, and the client endpoints 116. The communication links 152 can be over one or more networks, such as a private network and/or a public network. Communications can flow up to the cloud layer 154 and/or down to the client endpoints 116.

The fog layer 156 or "the fog" provides the computation, storage and networking capabilities of traditional cloud networks, but closer to the endpoints. The fog can thus extend the capabilities of the cloud 102 to be closer to the client endpoints 116. The fog nodes 162 can be the physical implementation of fog networks. Moreover, the fog nodes 162 can provide local or regional services and/or connectivity to the client endpoints 116. As a result, traffic and/or data can be offloaded from the cloud 102 to the fog layer 156 (e.g., via fog nodes 162). The fog layer 156 can thus provide faster services and/or connectivity to the client endpoints 116, with lower latency, as well as other advantages such as security benefits from keeping the data inside the local or regional network(s), and service resiliency in the presence of certain cloud layer or network failures.

The fog nodes 162 can include any networked computing devices, such as servers, switches, routers, controllers, cameras, access points, gateways, etc. Moreover, the fog nodes 162 can be deployed anywhere with a network connection, such as a factory floor, a power pole, alongside a railway track, in a vehicle, on an oil rig, in an airport, on an aircraft, in a shopping center, in a hospital, in a park, in a parking garage, on a street corner, in a library, etc.

In some configurations, one or more fog nodes 162 can be deployed within fog instances 158, 160. The fog instances 158, 160 can be local or regional clouds, networks, or nodes. For example, the fog instances 158, 160 can be a regional cloud or data center, a local area network, a network or cluster of fog nodes 162, etc. In some configurations, one or more fog nodes 162 can be deployed within a network, or as standalone or individual nodes, for example. Moreover, one or more of the fog nodes 162 can be interconnected with each other via links 164 in various topologies, including star, ring, mesh or hierarchical arrangements, for example.

In some cases, one or more fog nodes 162 can be mobile fog nodes. The mobile fog nodes can move to different geographic locations, logical locations or networks, and/or fog instances while maintaining connectivity with the cloud layer 154 and/or the endpoints 116. For example, a particular fog node can be placed in a vehicle, such as an aircraft or train, which can travel from one geographic location and/or logical location to a different geographic location and/or logical location. In this example, the particular fog node may connect to a particular physical and/or logical connection point with the cloud 154 while located at the starting location and switch to a different physical and/or logical connection point with the cloud 154 while located at the destination location. The particular fog node can thus move within particular clouds and/or fog instances and, therefore, serve endpoints from different locations at different times.

FIG. 1C illustrates a diagram of an example hierarchical cloud and fog architecture 170. In the example hierarchical cloud and fog architecture 170, the fog layer 156 includes various levels or layers of nodes, including, without limitation, high level nodes 172, intermediate level nodes 174, and low level nodes 176. Other examples can include additional or fewer number of levels or layers of nodes.

The levels 172-176 can represent sub-layers within the fog layer 156. Moreover, each of the levels 172-176 can include one or more nodes 162. Further, the levels 172-176 can vary based on one or more aspects, such as proximity to the cloud or client endpoints 116. For example, high level fog nodes 172 can be closer to the cloud. As used herein, the term "closer", when referring to multiple items (e.g., a reference to an item being closer to another item), can refer to logical proximity, physical proximity, number of hops, latency of communications, performance metrics, etc.

To illustrate, in a non-limiting example, the low-level fog nodes 176 can include one or more fog nodes 162 that are closer in proximity (logical and/or physical) to the client endpoints 116 than the cloud 102, have a lower latency or faster performance of communications to the client endpoints 116 relative to the cloud 102, etc.

The intermediate level fog nodes 174 can provide a layer below the high level fog nodes 172. Thus, the intermediate level fog nodes 174 may be closer to the client endpoints 116 than the high level fog nodes 172. The low level fog nodes 176 can provide yet another layer below the high level fog nodes 172 and the intermediate level fog nodes 174. Accordingly, the low level fog nodes 176 can be closer to the client endpoints 116 than both the high level fog nodes 172 and the intermediate level fog nodes 174.

The different levels in the fog layer (i.e., levels 172-176) can provide certain advantages over the cloud 102, such as performance and security advantages. Accordingly, data, workloads, services, resources, functions, operations, etc., can be offloaded or distributed from the cloud 102 to the different levels in the fog layer 156 in order to increase performance, security, reliability, etc. Likewise, the cloud 102 can provide advantages, such as cost, resources, scalability, etc. Thus, certain aspects (e.g., data, workloads, services, resources, functions, operations, etc.) can be hosted on the cloud 102 instead of the fog layer 156. A balance of advantages can be achieved by distributing data, workloads, services, resources, functions, operations, etc., in different ways throughout the cloud 102 and the different levels 172-176 in the fog layer 156. Orchestration systems, such as orchestration system 300 shown in FIG. 3, can coordinate this distribution.

Together, the cloud layer 154 and the different levels 172-176 in the fog layer 156 can allow for distribution or partitioning of an application, a service chain, a service, resources, etc. For example, as further described below with reference to FIG. 2, an application can be partitioned and distributed over different resources or nodes, such as containers or virtual machines, across the cloud layer 154 and the different levels 172-176 in the fog layer 156. To illustrate, using service function chaining techniques, an application which may ordinarily be hosted on a container on the cloud 102 or fog layer 156 can be partitioned into various functions or services which are hosted on a cluster of containers across the different levels 172-176 of the fog layer 156.

Figure 2A:
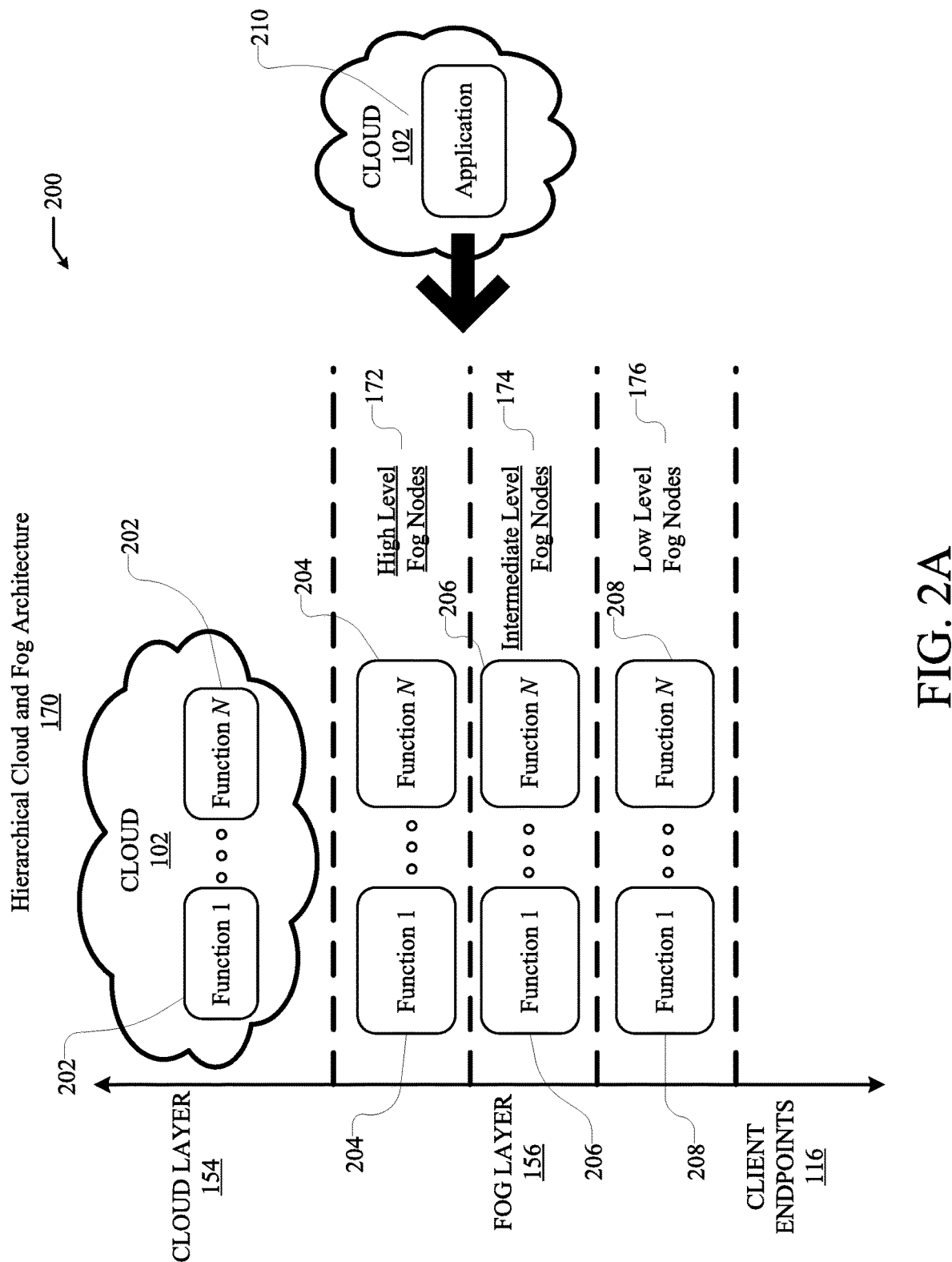
FIG. 2A illustrates a schematic diagram of an orchestration configuration of an application in a hierarchical cloud and fog architecture.

FIG. 2A illustrates a diagram of an example orchestration configuration 200 of an application in a hierarchical cloud and fog architecture 170. The application 210 may include multiple functions, components, services, and/or other aspects. This can allow the application 210 to be fragmented or partitioned (e.g., based on specific functions, components, services, etc.), in order to be distributed, based on the fragmented or partitioned portions, to different nodes along the hierarchical cloud and fog architecture 170. In this example, the application 210 is partitioned by functions 202-208 using, for example and without limitation, service function chaining techniques. The partitioning or fragmentation of application 210 by functions in FIG. 2A is provided as a non-limiting example for illustration purposes: other partitioning or fragmentation schemes and techniques are also contemplated herein.

As previously noted, the application 210 can be partitioned into functions 202-208 and each of the functions 202-208 distributed on the cloud and fog architecture 170. Such partitioning can be performed, for example and without limitation, based service function chaining techniques or other partitioning techniques which enable different portions, functions, services, or aspects of an application to run on different hosts.

The functions 202-208 can be distributed across the cloud 102 and different levels 172-176 of the fog layer 156. For example, functions 202 can be hosted on the cloud 102, functions 204 can be hosted on one or more of the high level fog nodes 172, functions 206 can be hosted on one or more of the intermediate level fog nodes 174, and functions 208 can be hosted on one or more of the low level fog nodes 176.

In some examples, each function can be hosted on a separate node, container, virtual machine, etc. However, in other examples, two or more functions may be hosted on a same node, container, virtual machine, etc. The number and/or identity of functions hosted by any particular node, container, virtual machine, etc., can vary in different implementations. Such variations in the different implementations can affect or impact the various parameters of the functions 202-208 and the application suite 210 as a whole.

For example, one or more factors such as the specific partitioning and/or distribution of the functions 202-208, as well as the specific layering or hierarchical configuration (e.g., number of levels in the fog layer 156, number of nodes in a particular level, number of resources available or allocated at a particular level, the distribution of nodes within levels 172-176, the type of nodes and/or platforms at a particular level, etc.) can improve the scalability, performance, cost, security, efficiency, reliability, and/or other parameters of the respective functions 202-208 and/or the application 210 as a whole. Accordingly, the particular partitioning or distribution (e.g., the number and/or identity of functions hosted in any particular node) and/or the specific layering or hierarchical configuration can be selected or configured based on specific factor(s) and/or requirement(s), such as scalability, performance, cost, security, efficiency, reliability, location, network conditions, resource availability, etc.

Some layers or levels may be better suited than others for certain things or may confer certain benefits may be better suited for, or yield a greater impact on, certain functions. Accordingly, when configuring a particular application for a particular partitioning or distribution scheme as well as layering or hierarchical configuration, the characteristics and/or requirements associated with the specific functions 202-208, as well as the characteristics or parameters of the various layers or levels (e.g., cloud 102 and levels 172-176) can be taken into account to intelligently identify the optimal scenario or configuration for a particular application.

As one of ordinary skill in the art will recognize, the characteristics or requirements can vary between different applications. Thus, the configuration or scenario selected can be tailored for an application. Such tailoring can take into account the relative characteristics and conditions of the various layers or levels. For example, higher layers or levels, such as the cloud 102 and high level nodes 172 may generally provide, without limitation, cost, resource, and scalability benefits. In some scenarios, it can also provide other benefits such as performance, reliability, etc. On the other hand, lower layers or levels, such as the low level nodes 176 and the intermediate level nodes 174 may provide, without limitation, other benefits, such as security and performance, for example. These are general characterizations which are often applicable, but may vary in different cases. Therefore, it can be advantageous to intelligently tailor each application.

To illustrate, moving the more resource-intensive functions to higher levels or layers in the hierarchical configuration, such as the cloud 102, the high level fog nodes 172, and/or the intermediate level fog nodes 174, may provide certain benefits such as lower cost or higher performance if the higher levels or layers are equipped with faster or additional resources. On the other hand, moving the more resource-intensive functions to lower levels or layers in the hierarchical configuration, such as the intermediate level fog nodes 174 or the low level fog nodes 176, may provide certain benefits such as higher performance, better latency or reliability if such levels or layers are able to allocate adequate or comparable resources while also providing communication or bandwidth benefits resulting, for example, from fewer communication hops or bottlenecks.

In addition, the distributed or partitioned nature of applications in the orchestration configuration 200 can also result in increased efficiency, performance, security, reliability, etc., as workloads and/or functions can be serviced by different resources within the hierarchical cloud and fog architecture 170.

Having disclosed example hierarchical cloud and fog architectures and configurations, the disclosure now turns to a detailed discussion of orchestration of cloud and fog interactions in a hierarchical cloud and fog architecture.

In a fog and cloud hierarchical architecture 170, application software and/or components that may otherwise be run in the cloud 102 or cloud layer 154 can be moved to a hierarchy of fog nodes (e.g., levels 172-176) that are arranged between the cloud layer 154 and the endpoint clients 116 or endpoint "Things". The arrangement of which software modules or components run at which layers of the cloud and fog hierarchy can be predetermined, but may also be dynamic, with the optimum location of a specific software module or component being determined by many factors, including current processor, storage or network loads on the application, latency targets, message transmission cost, node failures, security considerations, quality of service (QoS), reliability requirements, scalability, etc.

In some cases, cloud-based applications can be responsible for configuring, managing, monitoring, and load balancing some or all of the fog nodes 162 in the fog layer 156. However, given the various latency, security and availability requirements of Fog-based applications, there may be some measure of autonomy and performance scalability in the fog layer 156, which can limit the disruptions or impact in cases when, for example, the cloud 102 is unreachable, down, or overloaded.

Virtual machine and software container technologies, such as DOCKER and kernel-based virtual machine (KVM), can be implemented to manage the orchestration of resources in a cloud and fog hierarchical architecture, and further improve the versatility, performance and reliability of cloud and fog software management and orchestration.

When implementing a cloud and fog hierarchical architecture, the first step can be to partition a Cloud-Fog application, such as an application that would typically run in a single container or on a KVM system on a single host processor, into an interrelated collection or "cluster" of containers.

Partitioning can be along natural demarcation lines within the larger application, for example, cutting horizontally between the stages of a multi-step algorithm, or vertically across multiple parallel operations (e.g., for applications that support parallel execution). Well-defined inter-container communication pathways can tie the containers in a cluster together. In a simple deployment, the containers in the cluster needed to implement the entire application may run on a single host, sharing the same physical instance of an OS (Operating System) and hardware processor. The cluster of containers can be moved as a unit up or down the cloud and fog hierarchy 170 until the optimal level is found which may balance various parameters, such as the cost and/or resources used with the performance requirements. Cost considerations may naturally push cluster members up toward the cloud layer 154 where computation and storage may be cheaper, but performance requirements (e.g., latency, network bandwidth utilization, reliability, security, etc.) may push the cluster members down toward the lower fog layer 156 or the lower fog levels, such as intermediate level 174 or low level 176 for instance.

The partitioning, orchestration and management of functions between the cloud layer 154 and the levels 172-176 of the fog layer 156 may be especially carefully considered in times of highly dynamic or abnormal operation. When there is some sort of failure, natural disaster, temporary overload, or network-wide security problem, the cloud layer 154 or cloud 102 may change its mode from "overlord" to "assistant" until the problem is rectified. Containers may need to be moved between cloud and fog layers 154, 156 in response to highly dynamic network conditions. Context data consistency and integrity may also be managed. Various techniques and mechanisms can be implemented to quickly and reliably detect the need for such a change and make the transition seamlessly.

Figure 2B:
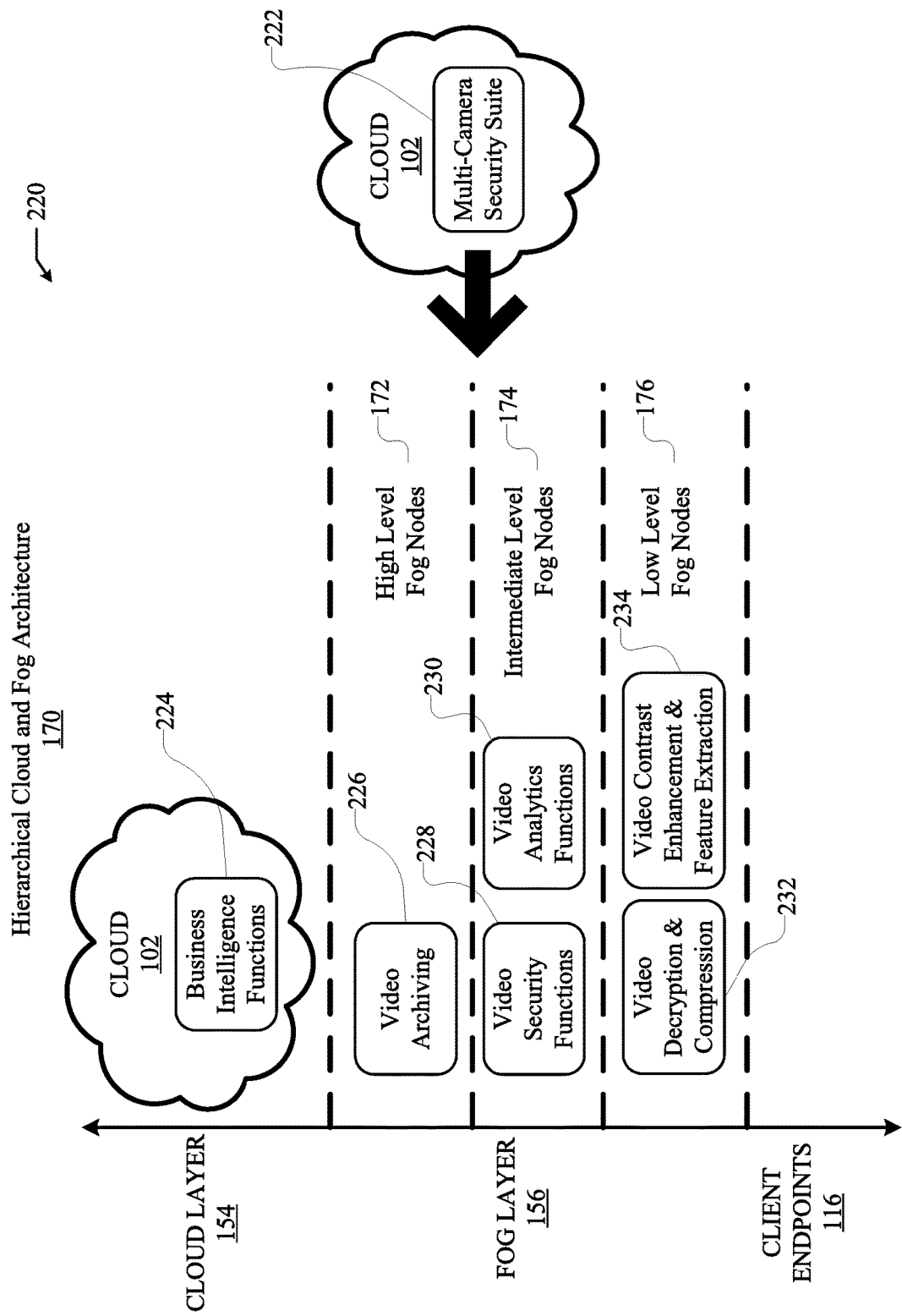
FIG. 2B illustrates a schematic diagram of an example use case for an orchestration configuration of an application in a hierarchical cloud and fog architecture.

For an example of how an application may be split into a cluster of containers and orchestrated in the cloud and fog hierarchical architecture 170, consider the example shown in FIG. 2B.

FIG. 2B illustrates an example configuration 220 of an application 222 in a hierarchical cloud and fog architecture 170. In this example, a multi-camera security suite 222 can be moved from the cloud 102 according to configuration 220. The multi-camera security suite 222 is used here for illustration purposes to show the implementation of an application from the cloud 102 to a hierarchical cloud and fog model.

To implement the multi-camera security suite 222 in a hierarchical cloud and fog model 170, the multi-camera security suite 222 can be partitioned into functions 224-234. As previously explained, such partitioning can be performed, for example and without limitation, based service function chaining techniques or other partitioning techniques which enable different portions, functions, services, or aspects of an application to run on different hosts.

In the example of multi-camera security suite 222, the "Things" or client endpoints 116 can include a network of cameras that send video streams to a multi-camera security suite application 222, which can be an analytics, storage and business intelligence application (e.g., perhaps as a single container, traditionally located in the cloud 102). The functions 224-234 can include business intelligence functions 224, video archiving 226, video security 228, video analytics 230, video decryption and compression 232, and video contrast enhancement and feature extraction 234, which makeup the multi-camera security suite 222. Other additional functions can also be included without limitation.

The functions 224-234 can be distributed across the cloud 102 and different levels 172-176 of the fog layer 156. For example, the business intelligence functions 224 can be hosted on the cloud 102. The video archiving 226 can be hosted on one or more of the high level fog nodes 172, the video security 228 and video analytics 230 functions can be hosted on one or more of the intermediate level fog nodes 174, and the video decryption and compression 232 and video contrast enhancement and feature extraction 234 functions can be hosted on one or more of the low level fog nodes 176. This example distribution is provided for illustration purposes and may vary based on one or more factors, such as resources, service requirements, network conditions, application or function characteristics, etc.

In some examples, each of functions 224-234 can be hosted on a separate node, container, virtual machine, etc. However, in other examples, two or more of the functions 224-234 may be hosted on a same node, container, virtual machine, etc. The number and/or identity of functions hosted by any particular node, container, virtual machine, etc., can vary in different implementations. In yet other examples, particularly resource intensive functions such as video analytics functions 230 may span more than one fog node in a layer, exploiting multi-node parallelism. As previously explained with reference to FIG. 2A, such variations in the different implementations can affect or impact the various parameters of the functions 224-234 and the application suite 222 as a whole.

The functions 224-234 can be containers assembled in a service function chain. Thus, in configuration 220, the application 222 can be partitioned into a number of containers assembled in a service function chain. In this example, the configuration 220 can be described as follows.

The lowest level containers (i.e., 232 and 234) may decrypt and decompress a video stream from a camera, and may provide contrast enhancement and feature extraction.

Next, a container 230 may include video analytics functions like pattern matching and object recognition. Another container, container 228, can take the analytics outputs and uses them to perform security functions like detecting people crossing an e-fence, or finding evidence of shoplifting. Other containers could detect the flow of customers in the videos, to help store planning and merchandising.

The next level of containers, container 226, may archive interesting video segments for later viewing. The highest level of container, container 224, can provide business intelligence functions, like alerting the owner if a security or store layout problem is discovered. If multiple cameras are in operation, multiple instances of the relevant subset of containers can be duplicated and run in parallel, still as part of the cluster.

Other applications, such as IoT applications from other verticals, like autonomous vehicles, smart cities, smart grids, and healthcare, may have their own set of natural partitioning to map their algorithms into chains of containers in a cluster.

Instead of running all containers (e.g., 224-234) in the cluster in a same cloud server or fog node, the containers may be split up and down and across the cloud and fog hierarchy. Thus, the lowest layer fog nodes 176 may run the lowest level video functions, the intermediate fog nodes 174 may run the analytics functions, the high layer fog nodes 172 may run the archival functions, and the cloud 102 may run the business intelligence.

The orchestration system can carefully manage which containers of the cluster run at which levels of the cloud and fog hierarchy 170, and may continue to tune this mapping based different measurements such as network performance. This can optimize various IoT network attributes like latency, security, network bandwidth, reliability, and cost.

The mapping of which containers in the cluster run on which layers of the cloud and fog hierarchy 170 need not be static. As the loads on the cloud 102 and fog nodes 162 fluctuate up and down, and as the performance of the application and the data complexity on which it operates varies, it is possible to dynamically move containers to other levels or layers of the hierarchy 170.

For example, if the automated orchestration system detects that latency is approaching a critical limit, some of the more computational-intensive functions may be moved one step lower in the fog layer 156, where they are presumably closer to the client endpoints 116 or "Things", and should have shorter response times. Conversely, if other applications (with their own clusters of containers) are requesting space on some fog node that is currently fully occupied, or if an application is costing more fog resources than allocated, and if there is performance margin to spare, some containers could be moved one step up towards the cloud layer 154. This sort of movement could also be horizontal, between peer fog nodes on the same level of the hierarchy 170 to help balance the loads among them.

For example, if a single fog node is running the image processing and analytics functions 230 for multiple cameras, and is running out of resources, the containers associated with the second and subsequent cameras could be off-loaded to adjacent fog node(s).

Another reason to dynamically move containers within a cluster between fog nodes may be for fault tolerance. If a fog node, network link, or power source failure is detected, the same facilities that provided load balancing in the above paragraph could be used to automatically move the load off the failed resource to a nearby redundant resource, and non-stop operation of the application can be preserved. If an entire cloud data center in the cloud layer 154 is becoming seriously overloaded, is unreachable because of a network problem, or is in danger of a failure, the containers running on the cloud layer 154 and the orchestration controlling the entire cluster can be temporarily moved down to the highest level 172 of fog nodes, making fog an extension of, but temporarily independent from, the cloud layer 154.

The agility in software partitioning this cluster of containers scheme provides can make possible mission critical and even life critical applications in IoT, without an unacceptably high software development expense.

Other factors for moving containers within a cluster between nodes or layers in the cloud and fog hierarchy 170 include security. For example, if automatic security audits detect a node in a cluster is experiencing some sort of security compromise (e.g., physical attack, cyber attack, DDoS attack, hacking, crypto key compromise, etc.), the cluster orchestration system can instantly move load off the suspicious nodes, and isolate them for deeper investigation. Certain critical IoT applications (especially those in control of potentially dangerous IoT actuators) may have very stringent security requirements. This system can improve end-to-end security by isolating specific questionable nodes. Also, when software patches or hardware updates are required (security related or otherwise), this system can perform a rolling update process, where only specific containers in the cluster are moved to adjacent nodes, the updates are made, and the containers are then moved back.

Ideally, a container move should operate within the latency window of the worst-case fog applications—which is on the order of a few milliseconds. Thus, the algorithm can yield low latency moving of containers. The move of a container can involve pausing the operation of one container in the cluster, collect its operational context (e.g., in-flight data, intermediate results, database entries, etc.), move that context to the destination node, restore the context, and restart the container. One technique that may make this faster is to have the cluster's orchestration system, which decides when and where to move containers within a cluster, declare the possible destination nodes where each container could end up moving in advance. A "dummy container" can be made to shadow the active container on each possible destination node. Background messages can be sent between the active container and the dummy containers at the possible locations it may move to, in order to keep the slow-changing context (e.g., user databases, billing records, etc.) up-to-date throughout.

This way, when the real move is necessary, only in-flight data would have to be packaged and sent in a hurry to the new node. Hopefully, if this is done right, the application users and round-trip latency critical IoT use cases will not notice the refactoring the orchestration system is doing to continuously optimize the cloud and fog network. Pre-planning of possible destinations should the orchestration system decide to move active containers, and the two-phase process to keep the shadow containers updated can provide significant advantages.

The orchestration technologies herein can optimize use of various resources, including CPU, storage, network, etc. For example, if a special protocol conversion task is required at the Cloud-Fog boundary, the algorithm performing the special protocol conversion task can be configured into a container. The orchestration system can continuously monitor the network processing load on both the cloud 102 and fog nodes 162, and dynamically move the container to whichever side of the Cloud-Fog boundary has a lighter load. Storage can benefit from similar dynamic assignment. For example, if a video caching service is running in a container, and the network detects a focused load on a specific fog node, or a nearly exhausted storage array on the selected cloud servers, the storage container (including the compressed video it serves) can be moved down from the cloud layer 154 (e.g., cloud 102) to the fog layer 156. This process could continue to descend lower into the Fog Layer 156 until the optimal balance of resource use and performance is achieved for the instantaneous video viewing patterns of the users of the network.

As previously described, the distribution of the container elements of the cluster along the Cloud-Fog continuum (e.g., cloud and fog hierarchy 170) can be determined based on resource usage information provided by the orchestration layer (e.g., Docker/LXC mem_info, CPU usage, etc., by individual containers as fraction of total host resources). In other examples, however, the distribution of the container elements of the cluster along the Cloud-Fog continuum can be intelligently and automatically determined based on resource usage telemetry streamed from both hosted resources (e.g., containers, bare-metal servers, etc.), as well as potentially the underlying network infrastructure. This resource usage telemetry information can be obtained by a variety of channels, such as API calls by a centralized SDN (software defined network) controller, also as (type 1 or 2) metadata from the Network Service Header (NSH) of a Service Function Chain containing a variety of containerized virtual network functions (VNFs), etc.

Irrespective of the source of this resource utilization telemetry, this information can be used to specify pre-configured policies for resource utilization for the various levels of the Cloud-Fog continuum as described above. In this manner the container orchestration layer has a well-defined stratification of the Cloud-Fog continuum such that it can quickly, intelligently and automatically deploy the various container cluster members appropriately based on application needs, and redeploy them dynamically as those needs change. This well-defined resource stratification of the Cloud-Fog continuum also allows for dynamic movement of cluster member containerized workloads to ensure sustainable high availability for the cloud layer 154 by a complementary fog infrastructure (e.g., fog layer 156).

The cloud and fog hierarchy 170 can react in real-time or near real-time using these techniques. This containerization automation throughout the cloud also enables and benefits from the ACI (application-centric infrastructure) data center architecture. The container "cluster" can itself be an application within an ACI network. As the cluster is dynamically moved throughout the Cloud-Fog continuum, the Cloud-Fog orchestration system may programmatically push policy updates through the ACI (if present in the architecture). As a more monolithic application is split into a container cluster, the policy governing access of bits of the application can be transparently taught to the fabric. This policy automation can continue out into the fog layer 156 by programming other controllers present within the network.

The orchestration system herein can provide agile mapping of complex applications into multiple containers in a cluster, and automatically move containers vertically between layers of the cloud and fog hierarchy 170 to optimize the balance between efficiency and performance. The system can also automatically move containers in a cluster horizontally between peer-level fog nodes to provide load balancing and exploit parallelism, for example, or to provide redundancy for fault tolerance.

FIG. 3 illustrates an example orchestration system 300 for managing and/or orchestrating an application in a cloud and fog hierarchy 170. The orchestration system 300 can manage and orchestrate containers, functions, and/or other components of an application, as previously explained.

The orchestration system 300 can include one or more devices or nodes. For example, the orchestration system 300 can be a single server or a group of servers. Moreover, the orchestration system 300 can reside in any layer within the cloud layer 154 and/or the fog layer 156. In some cases, the orchestration system 300 can include multiple nodes which can be distributed within the same layer or level in the cloud and fog hierarchy 170, or different layers or levels.

The orchestration system 300 can communicate with the cloud layer 154, the fog layer 156, and/or the client endpoints 116 via a network 308. For example, the orchestration system 300 can communicate with the cloud 102 and/or one or more of the fog nodes 162 in any of levels 172-176.

The orchestration system 300 can include an orchestration module 302, which can define, partition, cluster, and/or set containers, functions, etc., and map or schedule them to one or more specific layers, levels, and/or nodes within the cloud and fog hierarchy 170. The orchestration system 300 can also include a monitoring module 304 for monitoring containers, applications, application components, functions, network conditions, layers, levels, resources, requirements, etc. For example, the monitoring module 304 can collect performance and status information from specific nodes in the cloud and fog hierarchy 170 to identify conditions or events (e.g., failures, errors, availability, overloading, security breach, etc.). The monitoring module 304 can report any data, including conditions or events, to the orchestration module 302 in order to dynamically adjust the orchestration for one or more applications. The orchestration module 302 can use the data from the monitoring module 304 to identify which containers or functions should be moved and where they should be moved.

The orchestration system 300 can include a communications module 306 for communicating with network 308 and other nodes, networks, devices, etc. The orchestration system 300 can use the communications module 306 to send and receive messages, signals, alerts, packages, and communications with other devices and networks in the hierarchical architecture 170

Having disclosed some basic system components and concepts, the disclosure now turns to the example method embodiment shown in FIG. 4. For the sake of clarity, the method is described in terms of the hierarchical cloud and fog architecture 170, shown in FIGS. 1C and 2A-B, and orchestration system 300, shown in FIG. 3. The steps outlined herein are exemplary and can be implemented in any combination thereof, including combinations that exclude, add, or modify certain steps.

At step 400, the orchestration system 300 can partition an application into software containers. Each of the software containers can be configured to host one or more respective components of the application, such as a function, a feature, a service, a library, a portion of code, a data set, etc. For example, an application can be partitioned into functions, and the functions then allocated or configured on respective software containers. To illustrate, using service function chaining, an application involving ten functions can be partitioned into ten software containers where each of the software containers hosts or runs one of the ten functions. Containers can also hold the distributed data sets associated with an application. For example, static data may be in one set of containers, dynamic data and intermediate results in a second set, logs in a third set, etc.

At step 402, the orchestration system 300 can identify respective nodes on respective hierarchical layers (e.g., cloud layer 154 and fog layers 172-176) of a hierarchical cloud and fog architecture 170 for hosting the software containers on the respective hierarchical layers of the cloud and fog architecture 170. Here, the orchestration system 300 can select specific nodes or layers for hosting specific software containers. In other words, in addition to identifying the nodes, or as part of identifying the nodes, the orchestration system 300 can map or designate specific nodes to specific software containers. For example, the orchestration system 300 can map software container A to node X on fog layer Y, software container B to node W on fog layer Z, software container C to cloud 102, etc.

The identifying and mapping of nodes to containers can be based on one or more factors, such as performance, security, scalability, bandwidth, cost, resource availability, resource status, resource consumption or requirements, quality of service requirements, etc. The one or more factors can also include specific characteristics or parameters associated with the software containers, the application, and the specific components hosted at each of the software containers.

When identifying a node for a particular software container, the orchestration system 300 can compare, analyze, and/or match specific parameters of the particular software container, one or more specific nodes, and/or one or more specific layers in the hierarchical cloud and fog architecture. Specific parameters of a software container can be considered relative to parameters of other software containers. Likewise, specific parameters of a node or layer in the hierarchical cloud and fog architecture 170 can be considered relative to parameters of other nodes or layers.

For example, when identifying a node and layer to host a software container running video security functions 228 shown in FIG. 2B for application 222, the orchestration system 300 can identify specific parameters and/or characteristics and even make specific inferences regarding the video security functions 228, as well as nodes and layers in the hierarchical cloud and fog architecture 170. This information can then be analyzed to map a particular node and layer to the software container running the video security functions 228.

To illustrate, the orchestration system 300 can determine that the video security functions 228 have high security and/or performance requirements (or higher than other functions associated with the application 222). The orchestration system 300 may also determine that the low and intermediate level fog nodes 174, 176 provide higher security and performance than the high level fog nodes 172 or the cloud 102. The orchestration system 300 can then use this information to select or identify one or more nodes from the low level fog nodes 176 or the intermediate level fog nodes 174 for the software container associated with the video security functions 228. The orchestration system 300 can further tailor or fine tune the mapping for the software container associated with the video security functions 228 based on other considerations. For example, if the low level fog nodes 176 have limited capacity or availability or if other functions are given a higher priority to the low level fog nodes 176 based on relative parameters (e.g., performance, security, etc.), then the software container associated with the video security functions 228 can instead be mapped to the intermediate level fog nodes 174. The orchestration system 300 can thus identify a particular node from the intermediate level fog nodes 174 for the software container associated with the video security functions 228.

In some cases, nodes, functions, software containers, layers, etc., can be prioritized. For example, assume application A is partitioned by function into ten functions and corresponding software containers. The ten functions and corresponding software containers can be sorted or prioritized by one or more factors, such as performance and/or security requirements, for example. A priority can be determined for the ten functions. In some cases, multiple priorities can also be determined for the ten functions based on different factors. The priorities associated with the ten functions can be compared with specific parameters associated with the different nodes and/or layers in the hierarchical cloud and fog architecture 170. In some cases, the different nodes and/or layers of the hierarchical cloud and fog architecture 170 can also be ranked based on one or more factors. The priorities associated with the ten functions can then be compared with, or analyzed in view of, the rankings of the different nodes and/or layers. This can be used to identify and map nodes and layers to specific software containers and corresponding application components (e.g., functions).

To illustrate, an application partitioned into three functions and corresponding software containers can be analyzed to determine a relative rank or priority of the three functions based on performance demands or requirements. The ranking or prioritization can result in function A being ranked highest as having the greatest performance demands or requirements, function C ranked in the lowest as having the lowest performance demands or requirements, and function B ranked in the middle between functions A and C. The cloud and fog layers 154, 156 can also be ranked based on estimated and/or historical performance. The performance ranking can be, for example, low level fog nodes 176 ranked first (i.e., highest performance), intermediate level fog nodes 174 ranked second, high level fog nodes 172 ranked third, and the cloud 102 ranked last. The various rankings and prioritizations can be used to then map the functions to layers in the hierarchical cloud and fog architecture 170. For example, function A can be mapped to the low level fog nodes 176 based on a determination that function A is ranked highest as having the greatest performance demands or requirements, and the low level fog nodes 176 are ranked first based on performance. In some cases, a specific node within the low level fog nodes 176 can then be identified for, or mapped to, function A based on one or more factors, such as node and/or resource availability, proximity, bandwidth, cost, capacity, status, resource utilization, etc.

At step 404, the orchestration system 300 can deploy the software containers at the respective nodes on the respective hierarchical layers of the hierarchical cloud and fog architecture 170. For example, the orchestration system 300 can move, migrate, configure, install, run, and/or instantiate, the software containers on specific, selected nodes. This deployment can be performed when the application is being initially configured or setup in the hierarchical cloud and fog architecture 170, after the application has been setup in the hierarchical cloud and fog architecture 170, during operations of the application in the hierarchical cloud and fog architecture 170, etc.

In some cases, the deployment or a re-deployment of some or all of the software containers can be dynamic based on a triggering event, such as a failure, an alarm, a threshold, a performance condition, a security condition, a status, etc. For example, assume that functions 224-234 of application 222 in FIG. 2B have been deployed according to configuration 220 in FIG. 2B. Also assume that the video analytics functions 230 and/or a corresponding fog node have experienced an event, such as a failure, an overload, or a security event. Such event can trigger a dynamic re-deployment of the vide analytics functions 230 and/or the associated software container to a different node or layer, such as a node from the low level fog nodes 176. The orchestration system 300 can monitor for events and manage the dynamic deployment or redeployment of software containers or application components to different layers or nodes in the hierarchical cloud and fog architecture 170.

The orchestration system 300 can maintain shadow containers based on specific, active containers, at specific nodes or layers for redundancy and fault tolerance. For example, the orchestration system 300 can setup a software container on a node from the low level fog nodes 176 as a backup for the video security functions 228. The shadow software container can mirror some or all of the data and/or settings from the active software container of the video security functions 228. The shadow software container can also include operational context collected from the active software container to improve the efficiency of a transition or redeployment. Accordingly, the orchestration system 300 can collect operational context and other data from active software containers and move such data to shadow containers maintained as backups.

For the sake of clarity and illustration, FIG. 4 has been described with reference to software containers and functions associated with an application. However, other components and partition schemes are also contemplated herein. For example, in addition to software containers, the concepts can be applied to other types of hosts or environments, such as virtual machines, servers, switches, hypervisors, etc. Moreover, applications can be partitioned based on other aspects or components, such as application services, application code, application content, etc. This partitioning applies to containerized or otherwise partitioned data as well as software modules.

The disclosure now turns to FIGS. 5 and 6A-B, which illustrate example devices.

FIG. 5 illustrates an example network device 500 suitable for performing switching, port identification, and/or port verification operations. Network device 500 includes a master central processing unit (CPU) 504, interfaces 502, and a bus 510 (e.g., a PCI bus). When acting under the control of appropriate software or firmware, the CPU 504 is responsible for executing packet management, error detection, and/or routing functions. The CPU 504 preferably accomplishes all these functions under the control of software including an operating system and any appropriate applications software. CPU 504 may include one or more processors 508 such as a processor from the Intel X86 family of microprocessors. In an alternative embodiment, processor 508 is specially designed hardware for controlling the operations of network device 500. In a specific embodiment, a memory 506 (such as non-volatile RAM, a TCAM, and/or ROM) also forms part of CPU 504. However, there are many different ways in which memory could be coupled to the system.

The interfaces 502 are typically provided as modular interface cards (sometimes referred to as "line cards"). Generally, they control the sending and receiving of data packets over the network and sometimes support other peripherals used with the network device 500. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master microprocessor 504 to efficiently perform routing computations, network diagnostics, security functions, etc.

Although the system shown in FIG. 5 is one specific network device of the present invention, it is by no means the only network device architecture on which the present invention can be implemented. For example, an architecture having a single processor that handles communications as well as routing computations, etc., is often used. Further, other types of interfaces and media could also be used with the network device 500.

Regardless of the network device's configuration, it may employ one or more memories or memory modules (including memory 506) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 506 could also hold various software containers and virtualized execution environments and data.

The network device 500 can also include an application-specific integrated circuit (ASIC) 512, which can be configured to perform routing and/or switching operations. The ASIC 512 can communicate with other components in the network device 500 via the bus 510, to exchange data and signals and coordinate various types of operations by the network device 500, such as routing, switching, and/or data storage operations, for example.

FIG. 6 illustrates an example system embodiment. The more appropriate embodiment will be apparent to those of ordinary skill in the art when practicing the present technology. Persons of ordinary skill in the art will also readily appreciate that other system embodiments are possible.

FIG. 6 illustrates a system bus computing system architecture 600 wherein the components of the system are in electrical communication with each other using a bus 606. Exemplary system 600 includes a processing unit (CPU or processor) 604 and a system bus 606 that couples various system components including the system memory 620, such as read only memory (ROM) 618 and random access memory (RAM) 616, to the processor 604. The system 600 can include a cache 602 of high-speed memory connected directly with, in close proximity to, or integrated as part of the processor 604. The system 600 can copy data from the memory 620 and/or the storage device 608 to the cache 602 for quick access by the processor 604. In this way, the cache 602 can provide a performance boost that avoids processor 604 delays while waiting for data. These and other modules can control or be configured to control the processor 604 to perform various actions. Other system memory 620 may be available for use as well.

The memory 620 can include multiple different types of memory with different performance characteristics. The processor 604 can include any general purpose processor and a hardware module or software module, such as module 1 610, module 2 612, and module 3 614 stored in storage device 608, configured to control the processor 604 as well as a special-purpose processor where software instructions are incorporated into the actual processor design. The processor 604 may essentially be a completely self-contained computing system, containing multiple cores or processors, a bus, memory controller, cache, etc. A multi-core processor may be symmetric or asymmetric.

To enable user interaction with the computing device 600, an input device 622 can represent any number of input mechanisms, such as a microphone for speech, a touch-sensitive screen for gesture or graphical input, keyboard, mouse, motion input, speech and so forth. An output device 624 can also be one or more of a number of output mechanisms known to those of skill in the art. In some instances, multimodal systems can enable a user to provide multiple types of input to communicate with the computing device 600. The communications interface 626 can generally govern and manage the user input and system output. There is no restriction on operating on any particular hardware arrangement and therefore the basic features here may easily be substituted for improved hardware or firmware arrangements as they are developed.

Storage device 608 can be a non-volatile memory, and can be a hard disk or other types of computer readable media which can store data that are accessible by a computer, such as magnetic cassettes, flash memory cards, solid state memory devices, digital versatile disks, cartridges, random access memories (RAMs) 616, read only memory (ROM) 618, and hybrids thereof.

The system 600 can include an integrated circuit 628, such as an application-specific integrated circuit (ASIC) configured to perform various operations. The integrated circuit 628 can be coupled with the bus 606 in order to communicate with other components in the system 600.

The storage device 608 can include software modules 610, 612, 614 for controlling the processor 604. Other hardware or software modules are contemplated. The storage device 608 can be connected to the system bus 606. In one aspect, a hardware module that performs a particular function can include the software component stored in a computer-readable medium in connection with the necessary hardware components, such as the processor 604, bus 606, output device 624, and so forth, to carry out the function.

It can be appreciated that example system 600 can have more than one processor 604 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. A method comprising:
partitioning, via a processor, an application into a plurality of software containers, each of the plurality of software containers configured to host a respective component of the application, each respective component of the application having at least one characteristic;
identifying a plurality of nodes on respective hierarchical layers of a hierarchical cloud-fog architecture for hosting the plurality of software containers on the respective hierarchical layers of the hierarchical cloud-fog architecture, the hierarchical cloud-fog architecture comprising one or more cloud layers and one or more fog layers, the one or more fog layers including a plurality of sub-layers, each of the one or more cloud layers and each of the plurality of sub-layers having at least one characteristic, wherein the least one on characteristic of each of the one or more cloud layers and each of the plurality of sub-layers vary; and
deploying each of the plurality of software containers to a respective one of the one or more cloud layers and the plurality of sub-layers of the plurality of nodes based on a match between each of the at least one characteristic of each respective component of the application and the at least one characteristic of the one or more cloud layers or each of the plurality of sub-layers, each of the plurality of nodes associated with one of a plurality of dummy containers, the plurality of dummy containers configured to receive background messages sent between a respective one of the plurality of dummy containers and a respective one of the plurality of software containers to enable the respective one of the plurality of dummy containers to maintain context of the respective one of the plurality of software containers.

2. The method of claim 1, wherein each of the plurality of software containers is deployed to one or more respective nodes on a particular hierarchical layer based on a respective service parameter associated with at least one of the application, the plurality of software containers, the plurality of nodes, and the respective hierarchical layers of the hierarchical cloud-fog architecture.

3. The method of claim 2, wherein the respective service parameter comprises at least one of a cost metric, a performance metric, a security metric, a network metric, a resource metric, and a reliability metric.

4. The method of claim 3, wherein the deploying is triggered by one or more triggering conditions associated with the respective service parameter.

5. The method of claim 1, wherein deploying the plurality of software containers comprises dynamically deploying at least one of the plurality of software containers based on at least one of a triggering event and a current status of a service parameter associated with a current software container.

6. The method of claim 1, wherein the application comprises a service function chain, wherein each service function from the service function chain is associated with a respective one of the plurality of software containers.

7. The method of claim 1, further comprising:
monitoring a respective service parameter of at least one of the plurality of nodes and the respective hierarchical layers, based on data collected by at least one of the plurality of software containers and one or more hosts of the plurality of software containers, the one or more hosts comprising at least one of a network node, a hypervisor, and a compute environment.

8. The method of claim 1, further comprising:
collecting a respective operational context for each of the plurality of software containers; and
moving the respective operational context to one or more respective nodes from the plurality of nodes.

9. The method of claim 8, wherein deploying the plurality of software containers comprises:
moving a software container from the plurality of software containers to a node in a respective layer from the respective hierarchical layers of the hierarchical cloud-fog architecture; and
starting the software container within the node based on the respective operational context associated with the software container.

10. The method of claim 9, wherein the respective operational context associated with the software container is moved to a respective one of the plurality of dummy containers associated with the node prior to at least one of the moving of the software container and the starting of the software container.

11. The method of claim 1, further comprising:
identifying one or more respective potential destination nodes at one or more associated layers from the respective hierarchical layers, for deploying at least one of the plurality of software containers;
generating one or more shadow containers at the one or more respective potential destination nodes, the one or more shadow containers being based on one or more active containers from the plurality of software containers;
synchronizing operational context data from the one or more active containers to the one or more shadow containers; and
deploying the at least one of the plurality of software containers by migrating contents from the one or more active containers to the one or more shadow containers.

12. A system comprising:
one or more processors; and
at least one computer-readable storage medium having stored therein instructions which, when executed by the one or more processors, cause the one or more processors to:
partition an application into a plurality of software containers, each of the plurality of software containers configured to host a respective component of the application, each respective component of the application having at least one characteristic;
identify a plurality of nodes on respective hierarchical layers of a hierarchical cloud-fog architecture for hosting the plurality of software containers on the respective hierarchical layers of the hierarchical cloud-fog architecture, the hierarchical cloud-fog architecture comprising one or more cloud layers and one or more fog layers, the one or more fog layers including a plurality of sub-layers, each of the one or more cloud layers and each of the plurality of sub-layers having at least one characteristic, wherein the least one on characteristic of each of the one or more cloud layers and each of the plurality of sub-layers vary; and
deploy each of the plurality of software containers at a respective one of the one or more cloud layers and the plurality of sub-layers of the plurality of nodes based on a match between each of the at least one characteristic of each respective component of the application and the at least one characteristic of the one or more cloud layers or each of the plurality of sub-layers, each of the plurality of nodes associated with one of a plurality of dummy containers, the plurality of dummy containers configured to receive background messages sent between a respective one of the plurality of dummy containers and a respective one of the plurality of software containers to enable the respective one of the plurality of dummy containers to maintain context of the respective one of the plurality of software containers.

13. The system of claim 12, wherein each of the plurality of software containers is deployed to one or more respective nodes on a particular hierarchical layer from the hierarchical cloud-fog architecture based on a respective service parameter associated with at least one of the application, the plurality of software containers, the plurality of software nodes, and the respective layers of the hierarchical cloud-fog architecture.

14. The system of claim 13, wherein the respective service parameter comprises at least one of a cost metric, a performance metric, a security metric, a network metric, a reliability metric, and a resource metric.

15. The system of claim 12, the at least one computer-readable storage medium having stored therein additional instructions which, when executed by the one or more processors, cause the one or more processors to:
collect a respective operational context for each of the plurality of software containers; and
move the respective operational context to one or more respective nodes in the hierarchical cloud-fog architecture.

16. The system of claim 12, the at least one computer-readable storage medium having stored therein additional instructions which, when executed by the one or more processors, cause the one or more processors to:
identify one or more respective potential destination nodes at one or more associated layers from the respective layers, for deploying at least one of the plurality of software containers;
generate one or more shadow containers at the one or more respective potential destination nodes, the one or more shadow containers being based on one or more active containers from the plurality of software containers;
synchronize operational context data from the one or more active containers to the one or more shadow containers; and
deploy the at least one of the plurality of software containers by migrating contents from the one or more active containers to the one or more shadow containers.

17. A non-transitory computer-readable storage medium comprising:
instructions stored therein instructions which, when executed by one or more processors, cause the one or more processors to:
partition an application into a plurality of software containers, each of the plurality of software containers configured to host a respective component of the application, each respective component of the application having at least one characteristic;
identify a plurality of nodes on respective hierarchical layers of a hierarchical cloud-fog architecture for hosting the plurality of software containers on the respective hierarchical layers of the hierarchical cloud-fog architecture, the hierarchical cloud-fog architecture comprising one or more cloud layers and one or more fog layers, the one or more fog layers including a plurality of sub-layers, each of the one or more cloud layers and each of the plurality of sub-layers having at least one characteristic, wherein the least one on characteristic of each of the one or more cloud layers and each of the plurality of sub-layers vary; and deploy each of the plurality of software containers at a respective one of the one or more cloud layers and the plurality of sub-layers of the plurality of nodes based on a match between each of the at least one characteristic of each respective component of the application and the at least one characteristic of the one or more cloud layers or each of the plurality of sub-layers, each of the plurality of nodes associated with one of a plurality of dummy containers, the plurality of dummy containers configured to receive background messages sent between a respective one of the plurality of dummy containers and a respective one of the plurality of software containers to enable the respective one of the plurality of dummy containers to maintain context of the respective one of the plurality of software containers.

18. The non-transitory computer-readable storage medium of claim 17, wherein each of the plurality of software containers is deployed one or more respective nodes on a particular hierarchical layer based on a respective service parameter associated with at least one of the application, the plurality of software containers, the plurality of nodes, and the respective hierarchical layers of the hierarchical cloud-fog architecture.

19. The non-transitory computer-readable storage medium of claim 18, wherein the respective service parameter comprises at least one of a cost metric, a performance metric, a security metric, a network metric, a reliability metric, and a resource metric.

20. The non-transitory computer-readable storage medium of claim 19, storing additional instructions which, when executed by the one or more processors, cause the one or more processors to:

monitor the respective service parameter based on data collected by at least one of the plurality of software containers and one or more nodes hosting the plurality of software containers, the one or more nodes comprising at least one of a network node, a hypervisor, and a compute environment.

* * * * *